(12) United States Patent
Koga et al.

(10) Patent No.: US 7,502,901 B2
(45) Date of Patent: Mar. 10, 2009

(54) MEMORY REPLACEMENT MECHANISM IN SEMICONDUCTOR DEVICE

(75) Inventors: Yoshihiro Koga, Kyoto (JP); Manabu Kuroda, Hyogo (JP); Noboru Asai, Osaka (JP); Kazutoshi Funahashi, Osaka (JP)

(73) Assignee: Panasonic Corporation, Osaka (JP)

( * ) Notice: Subject to any disclaimer, the term of this patent is extended or adjusted under 35 U.S.C. 154(b) by 306 days.

(21) Appl. No.: 10/735,917

(22) Filed: Dec. 16, 2003

(65) Prior Publication Data

US 2004/0193806 A1 Sep. 30, 2004

(30) Foreign Application Priority Data

Mar. 26, 2003 (JP) ............................. 2003-084894

(51) Int. Cl.
*G06F 12/00* (2006.01)
(52) U.S. Cl. ....................... 711/159; 711/154
(58) Field of Classification Search ................. 709/203; 711/5, 133, 128, 159; 365/192, 201; 718/105
See application file for complete search history.

(56) References Cited

U.S. PATENT DOCUMENTS

| | | | | |
|---|---|---|---|---|
| 4,084,230 A | * | 4/1978 | Matick | ............................ 711/5 |
| 4,742,450 A | * | 5/1988 | Duvall et al. | ................. 719/310 |
| 5,361,340 A | * | 11/1994 | Kelly et al. | .................... 711/3 |
| 5,537,595 A | * | 7/1996 | Sakata | ......................... 718/105 |
| 5,752,261 A | * | 5/1998 | Cochcroft, Jr. | .............. 711/133 |
| 5,900,012 A | * | 5/1999 | Tran | ............................ 711/120 |
| 6,151,269 A | * | 11/2000 | Dosaka et al. | ............... 365/233 |
| 6,233,195 B1 | * | 5/2001 | Yamazaki et al. | ....... 365/230.03 |
| 6,854,046 B1 | * | 2/2005 | Evans et al. | .................. 711/203 |
| 2004/0103251 A1 | * | 5/2004 | Alsup | ......................... 711/122 |

FOREIGN PATENT DOCUMENTS

JP 6-59977 3/1994

OTHER PUBLICATIONS

Dirk Gruwald, Benjamin Zorn, Robert Henderson, Improving the Cache Locality of Memory Allocation, Jun. 1993, Department of Computer Science, University of Colorado, pp. 2, 4-6.*

* cited by examiner

*Primary Examiner*—Reginald G. Bragdon
*Assistant Examiner*—Thanh D Vo
(74) *Attorney, Agent, or Firm*—McDermott Will & Emery LLP

(57) ABSTRACT

A semiconductor device has a processor, a first memory unit accessed by the processor, a plurality of page memory units obtained by partitioning a second memory unit which is accessible by the processor at a speed higher than the speed at which the first memory unit is accessible such that each of the page memory units has a storage capacity larger than the memory capacity of a line composing a cache memory, a tag adding, to each of the page memory units, tag information indicative of an address value in the first memory unit and priority information indicative of a replacement priority, a tag comparator for comparing, upon receipt of an access request from the processor, the address value in the first memory unit with the tag information held by the tag, and a replacement control unit for replacing the respective contents of the page memory units.

16 Claims, 27 Drawing Sheets

FIG. 4

| WRITE-BACK ATTRIBUTE | PRE-LOAD ATTRIBUTE | WEIGHT |
|---|---|---|
| ABSENT | ABSENT | 0 |
| PRESENT | ABSENT | 1 |
| ABSENT | PRESENT | 1 |
| PRESENT | PRESENT | 2 |

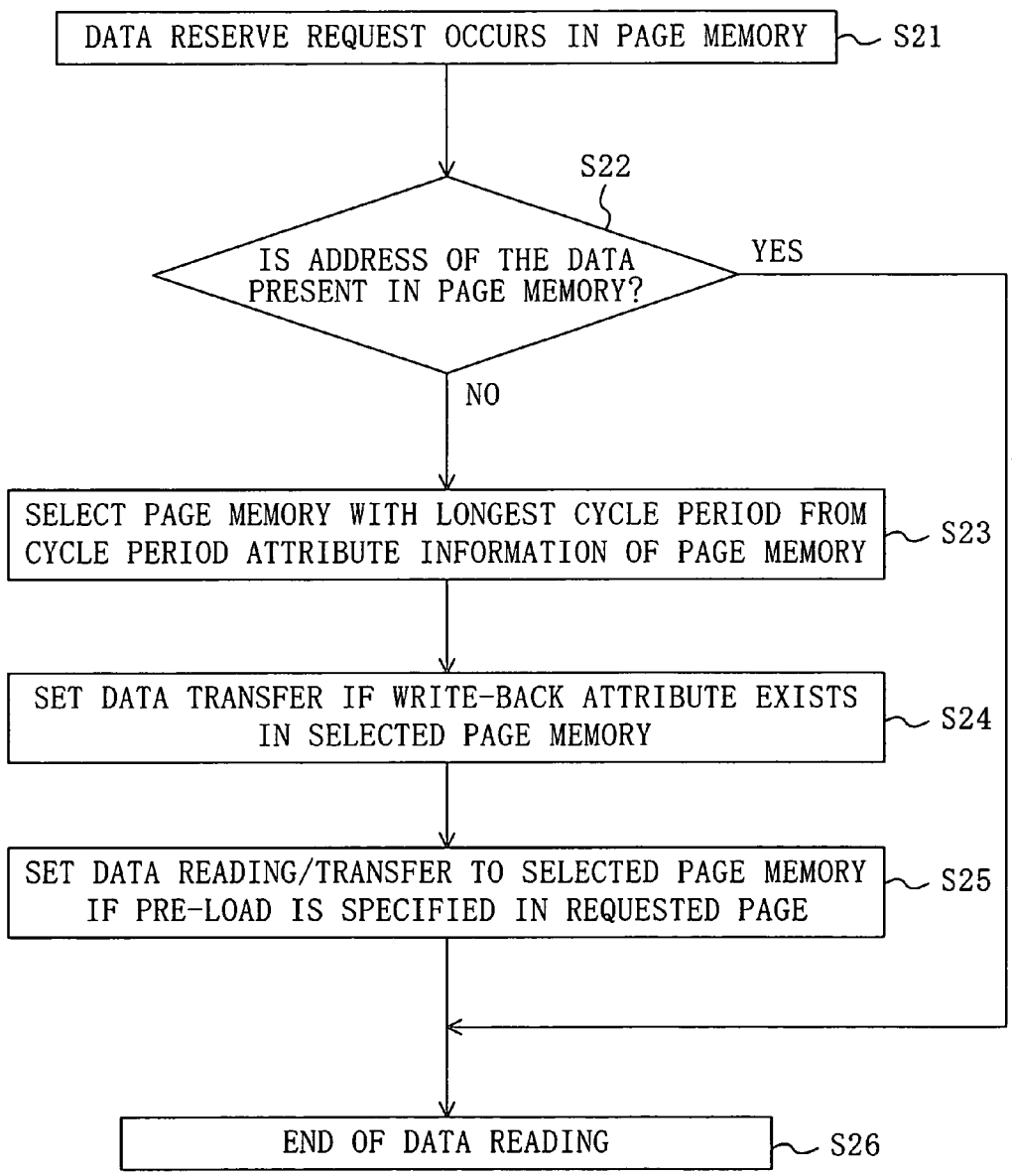

• WHEN 10 MEMORIES EXIST

FIG. 7A

| APPLICATION NAME | NUMBER OF ALLOCATED MEMORIES |
|---|---|
| APPLICATION(A) | 4 |
| APPLICATION(B) | 3 |
| APPLICATION(C) | 3 |

EMPTY MEMORY REQUEST FROM APPLICATION (D)

FIG. 7B

| APPLICATION NAME | NUMBER OF ALLOCATED MEMORIES |
|---|---|
| APPLICATION(A) | 3 |
| APPLICATION(B) | 3 |
| APPLICATION(C) | 2 |
| APPLICATION(D) | 2 |

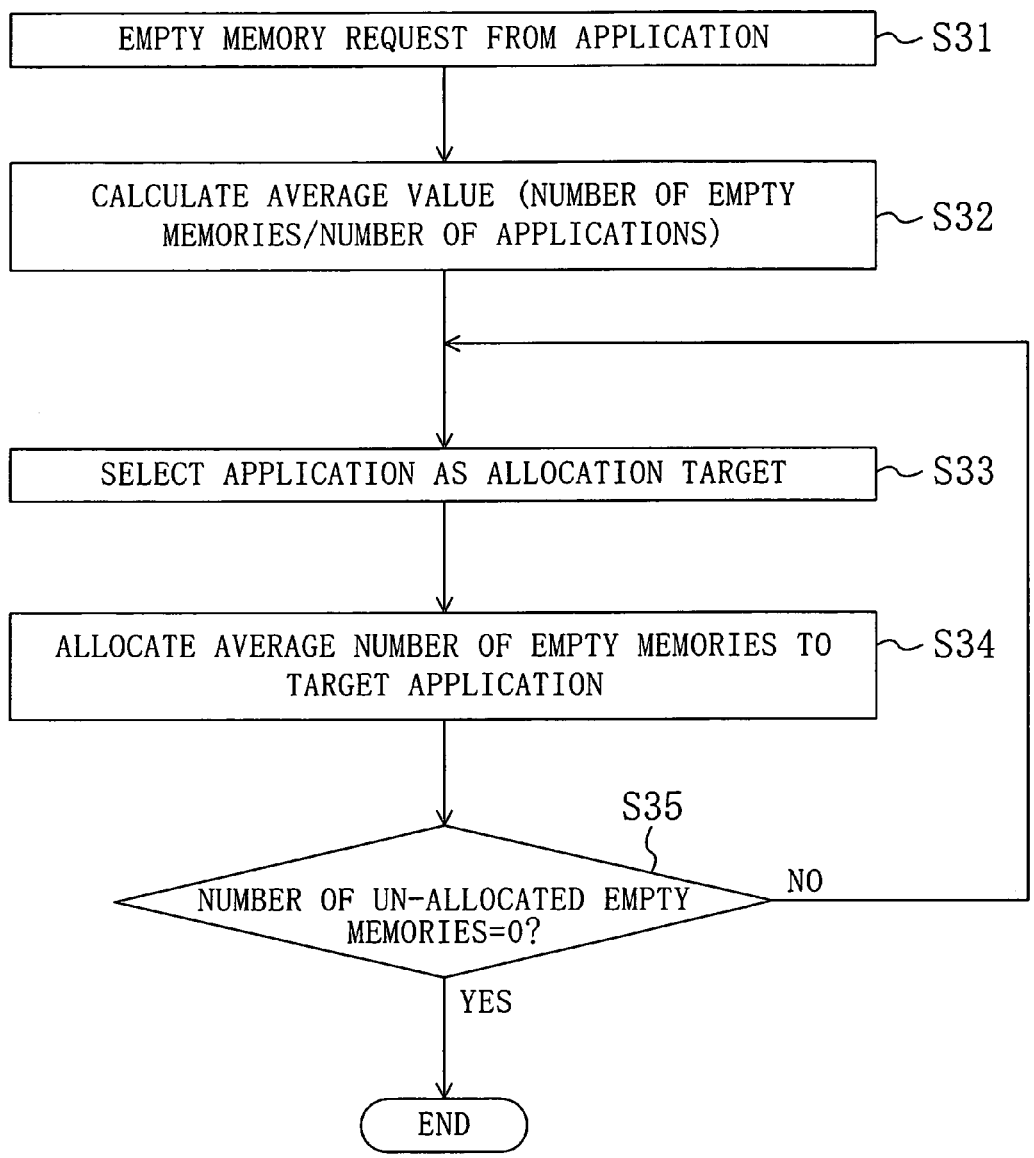

• WHEN 10 MEMORIES EXIST

FIG. 9A

| APPLICATION NAME | PRIORITY | DESIRED NUMBER OF MEMORIES | NUMBER OF ALLOCATED MEMORIES |
|---|---|---|---|
| APPLICATION (A) | 1 | 4 | 4 |
| APPLICATION (B) | 2 | 4 | 4 |
| APPLICATION (C) | 3 | 4 | 2 |

EMPTY MEMORY REQUEST FROM APPLICATION (D)

FIG. 9B

| APPLICATION NAME | PRIORITY | DESIRED NUMBER OF MEMORIES | NUMBER OF ALLOCATED MEMORIES |
|---|---|---|---|
| APPLICATION (A) | 1 | 4 | 4 |
| APPLICATION (D) | 1 | 4 | 4 |
| APPLICATION (B) | 2 | 4 | 2 |
| APPLICATION (C) | 3 | 4 | 0 |

· WHEN 10 MEMORIES EXIST

| APPLICATION NAME | OPERATION CYCLE[ms] | DESIRED NUMBER OF MEMORIES | NUMBER OF ALLOCATED MEMORIES |
|---|---|---|---|
| APPLICATION (A) | 20 | 4 | 4 |
| APPLICATION (B) | 30 | 4 | 4 |
| APPLICATION (C) | 60 | 4 | 2 |

EMPTY MEMORY REQUEST FROM APPLICATION (D)

| APPLICATION NAME | OPERATION CYCLE[ms] | DESIRED NUMBER OF MEMORIES | NUMBER OF ALLOCATED MEMORIES |
|---|---|---|---|
| APPLICATION (A) | 20 | 4 | 4 |
| APPLICATION (D) | 20 | 4 | 4 |
| APPLICATION (B) | 30 | 4 | 2 |
| APPLICATION (C) | 60 | 4 | 0 |

FIG. 13A

| APPLICATION NAME | AMOUNT OF INFORMATION TRANSFERRED PER UNIT TIME | NUMBER OF ALLOCATED MEMORIES | NUMBER OF ACQUIRED MEMORIES |
|---|---|---|---|
| APPLICATION (A) | 20 | 4 | 4 |
| APPLICATION (B) | 30 | 4 | 4 |
| APPLICATION (C) | 60 | 4 | 2 |

EMPTY MEMORY REQUEST FROM APPLICATION (D)

FIG. 13B

| APPLICATION NAME | AMOUNT OF INFORMATION TRANSFERRED PER UNIT TIME | DESIRED NUMBER OF MEMORIES | NUMBER OF ACQUIRED MEMORIES |
|---|---|---|---|
| APPLICATION (A) | 20 | 4 | 4 |
| APPLICATION (D) | 20 | 4 | 4 |
| APPLICATION (B) | 30 | 4 | 2 |
| APPLICATION (C) | 60 | 4 | 0 |

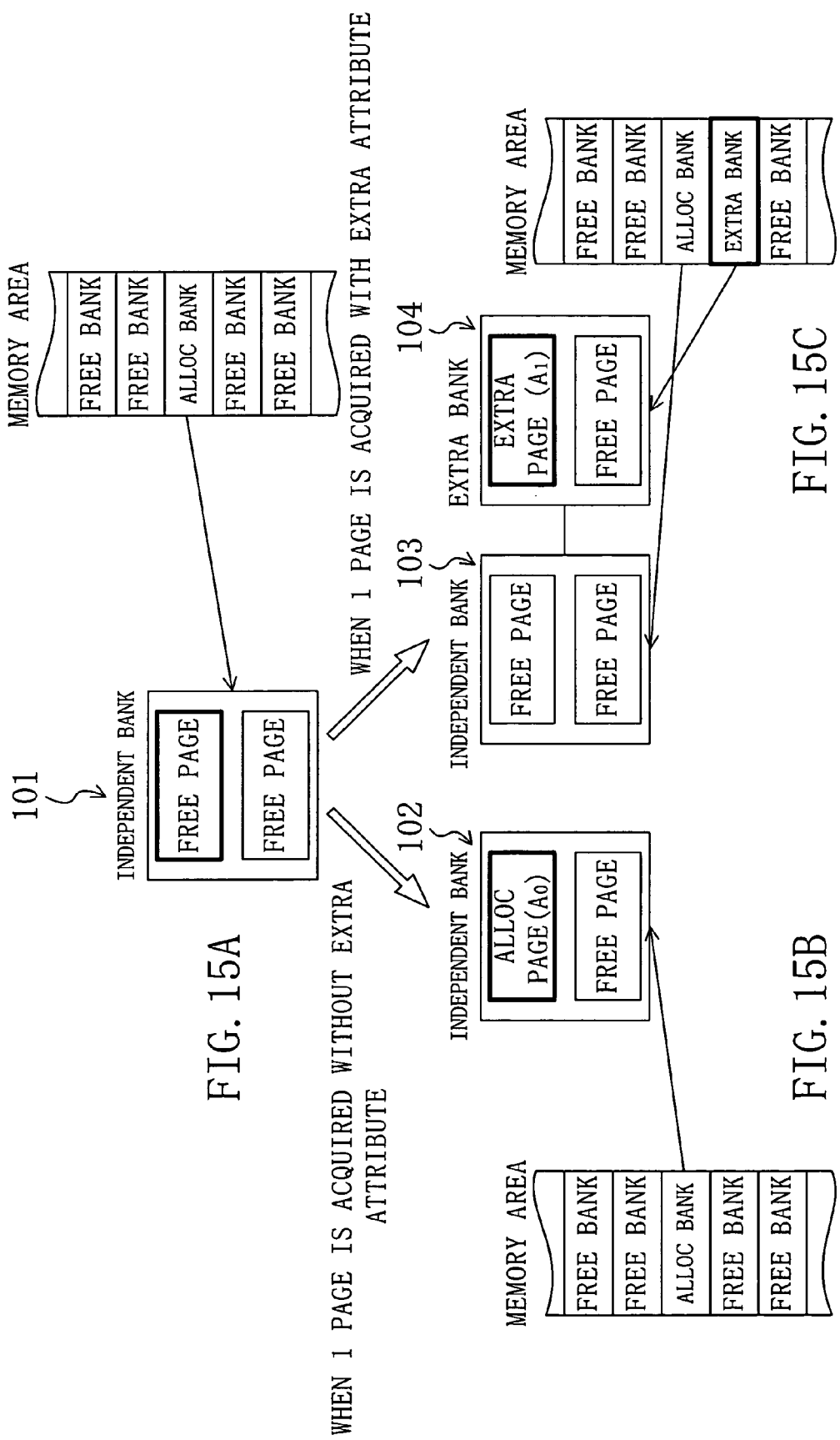

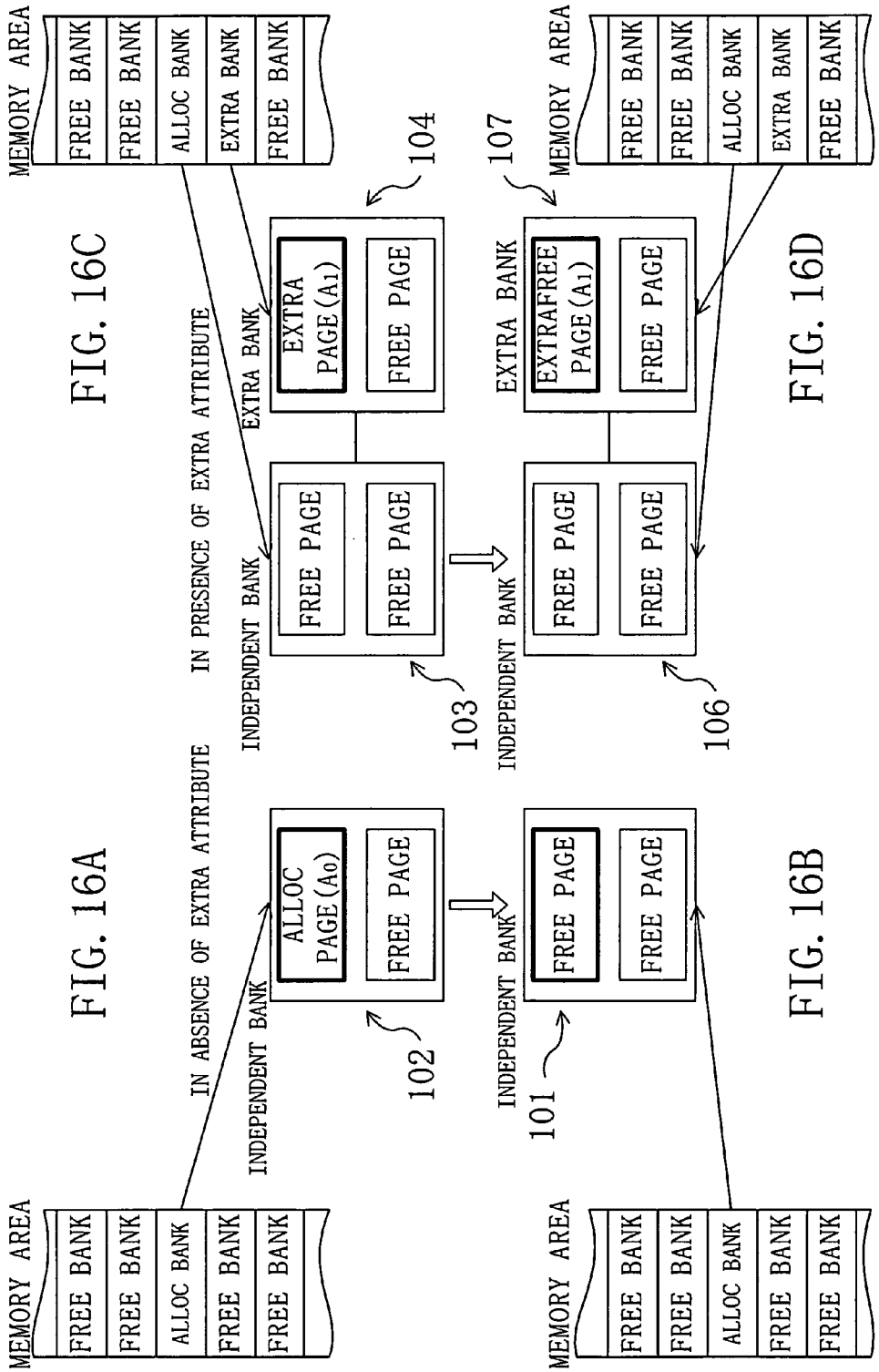

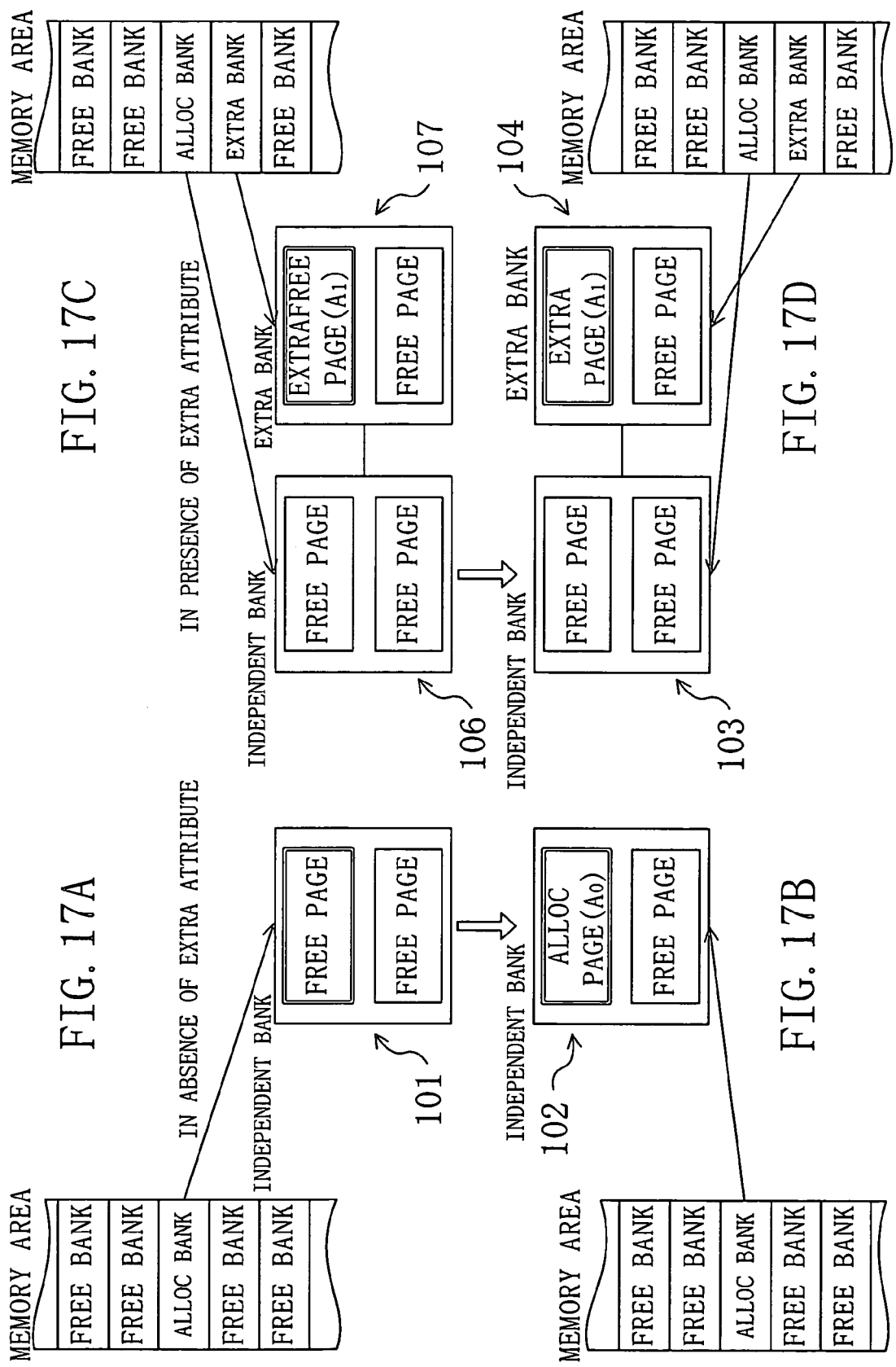

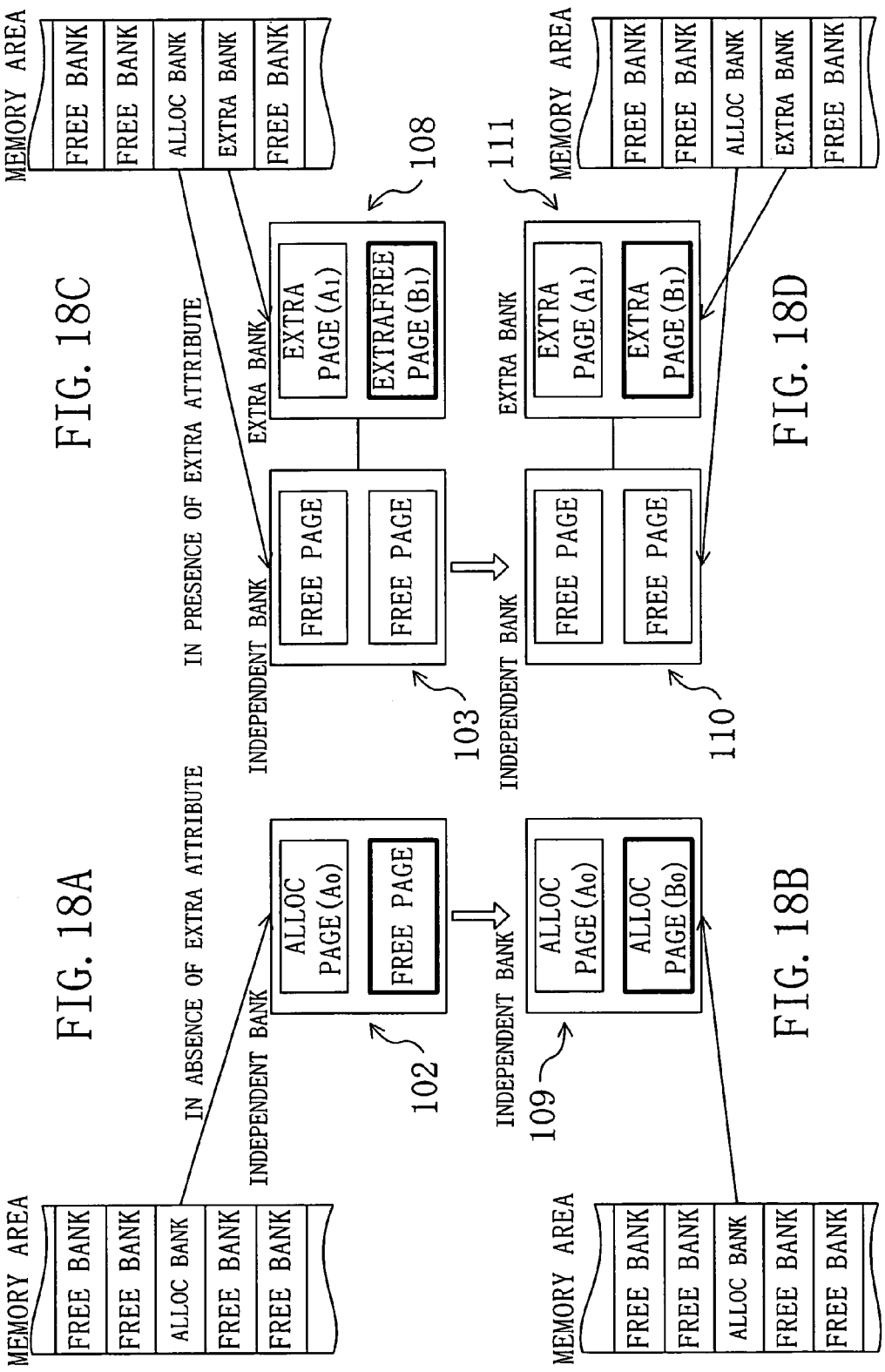

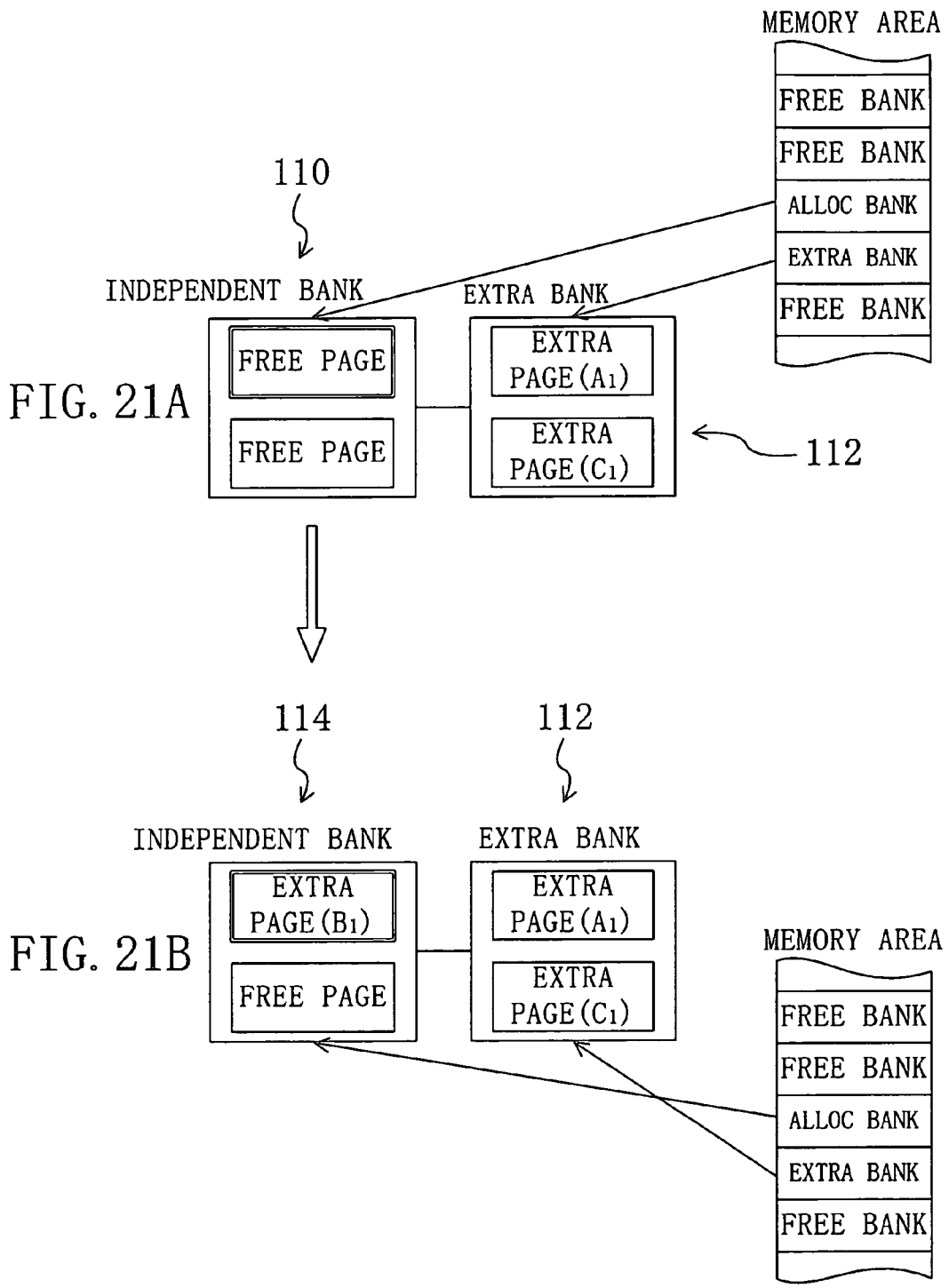

FIG. 22

|     | [A] | [B] | [C] | [D] |
|-----|-----|-----|-----|-----|
| [1] | 1   | 2   | 3   | —   |
| [2] | —   | —   | 4   | 7   |
| [3] | —   | —   | 5   | —   |
| [4] | —   | —   | 6   | —   |
| [5] | —   | 8   | —   | —   |

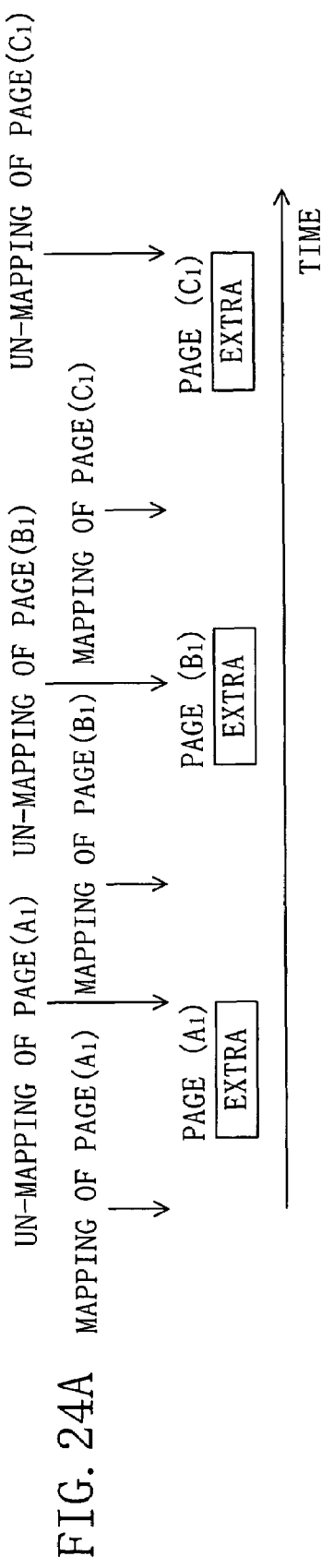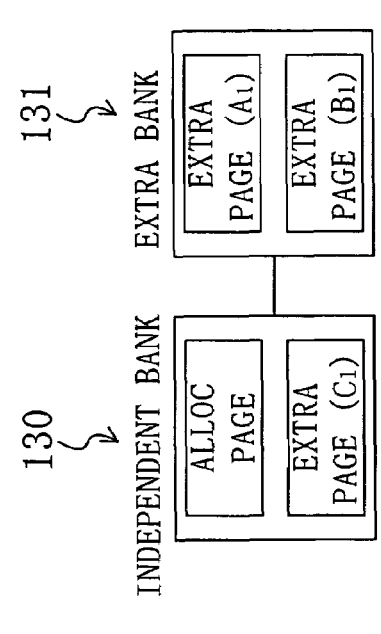

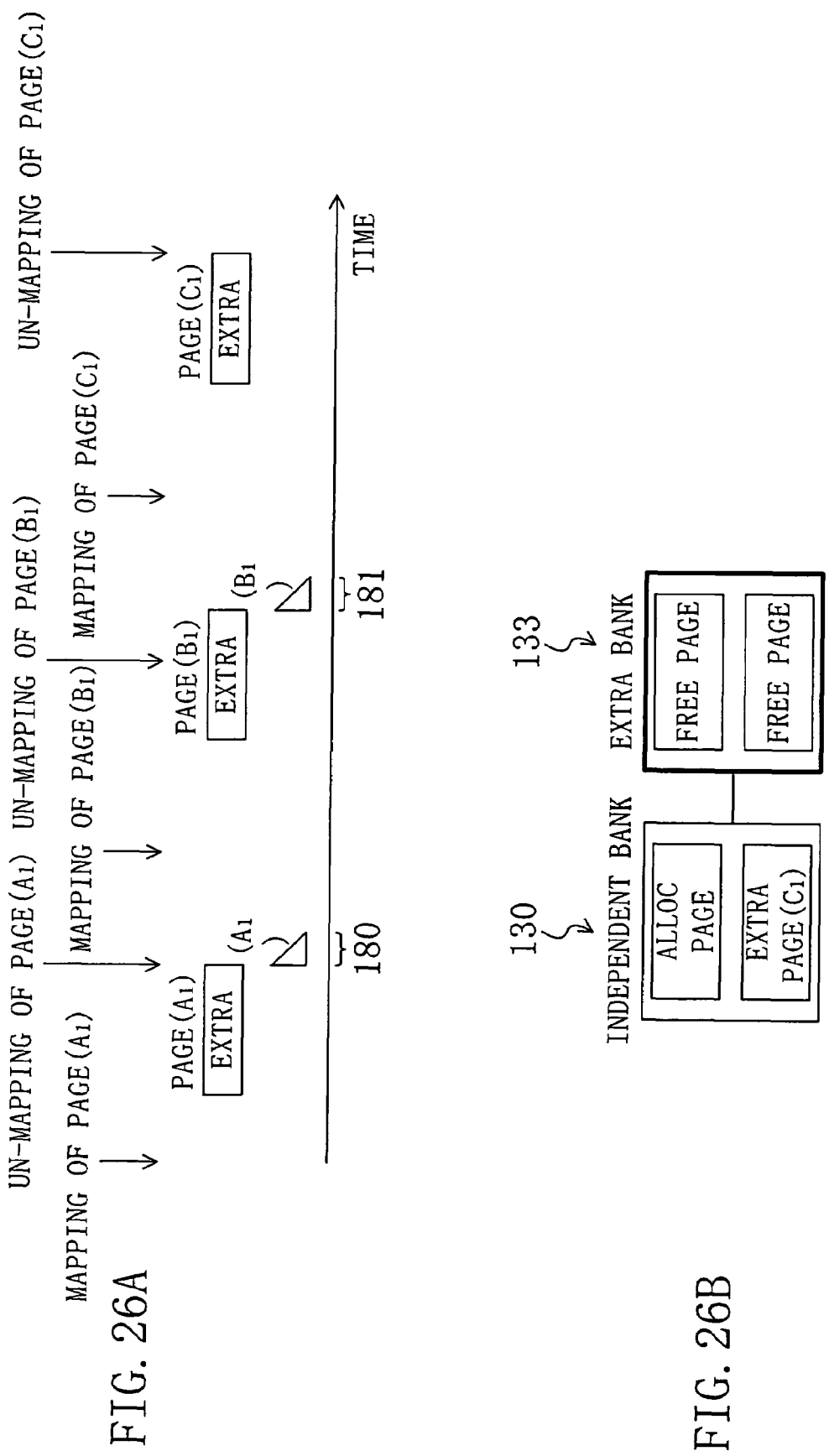

MEMORY REPLACEMENT MECHANISM IN SEMICONDUCTOR DEVICE

BACKGROUND OF THE INVENTION

The present invention relates to a semiconductor device having a processor, in a broad sense, with a memory replacement mechanism.

In a conventional memory-mounted processor, the scaling up of a program mounted thereon leads directly to an increase in the quantity of memories mounted thereon so that the problems of higher cost and a lower operating speed are encountered.

To solve the problems, there has been proposed a structure provided with a memory replacement mechanism in which a low-cost large-scale memory is used to compose a main memory irrespective of the low-speed operation thereof and small-capacity memories are mounted on a processor. In the structure, a program is executed by performing replacement between the small-capacity memories and the main memory. It has been a main stream to use so-called cache memories for such a conventional memory replacement mechanism.

A description will be given herein below to a conventional basic cache memory.

Reference to a memory when a processor gives an instruction or refers to data is localized to a memory region when viewed in a unit time, which is termed the locality of reference of a program. A technology has been known which enables higher-speed memory access by utilizing the locality of reference and thereby causing the region to which frequent memory reference is localized to reside in a buffer memory having a capacity smaller than the main memory and capable of high-speed operation. The smaller-capacity buffer memory is generally termed a cache memory and data transfer in causing frequently referenced data to reside in the cache memory is executed by using hardware.

Referring to FIG. 27, a conventional semiconductor device which is a combination of a processor with a cache memory will be described herein below.

As shown in FIG. 27, the conventional semiconductor device with the cache memory has: a processor 201; a large-capacity main memory 202 which is accessible at a low speed by the processor 201; and a cache memory 204 connected to the main memory 202 with a DMA controller 203 interposed therebetween to be accessed by the processor 201.

The cache memory 204 has been partitioned into lines A, B, C, and D each having a capacity of about several tens of bytes. Each of the lines A to D is provided with a tag 205 for holding information on an address and the like in a one-to-one correspondence. A plurality of instructions or data sets are stored normally in the lines.

The conventional semiconductor device also has a tag comparator 206 for comparing an address to which- the processor 201 has issued an access request with the address held by each of the tags 205 and requesting, if they do not match, the replacement of address data to the DMA controller 203 as the result of comparison.

The following is a brief description of the operation of the conventional semiconductor device thus constructed.

(Step 1)
The processor 201 issues a memory access request.
(Step 2)
A memory address requested by the processor 201 is reported to the tag comparator 206 and the tag comparator 206 examines whether or not the requested address is included in the addresses in the tags 205.

(Step 3)
If the requested address is included in any of the tags 205, the processor 201 proceeds to access the cache memory 204. In this case, the access is established and completed so that Step 4 and the steps subsequent thereto will not be performed. Thus, the state in which the requested address is held in the cache memory 204 is termed a cache hit or simply termed a hit. The cache hit rate influences an efficiency with which a program is processed. If the cache hit rate is high, an average memory access time is reduced so that the processing efficiency is increased.

(Step 4)
If the requested address is not included in any of the tags 205, the tag comparator 206 selects a proper page from the cache memory 204 based on priorities, which will be described later, and generates information on the result of comparison for performing a rewrite operation. The state in which the address is not held is termed a cache mishit or simply a mishit. As an algorithm for determining priorities in comparing the tags, an LRU (Least Recently Used) process has been known commonly. In this process, that one of the lines A to D referenced most previously is selected as a replacement target. Besides, a FIFO (First In First Out) process, a Random process, and the like are known. There is also a process which buries information used as a criterion for determining priorities in the instruction code of the processor 201 and determines the priorities based on the information (see, e.g., Japanese Laid-Open Patent Publication No. HEI 6-59977).

(Step 5)
The information on the result of comparison generated by the tag comparator 206 is reported to the DMA controller 203 and a lineful of data including the requested address is transferred from the main memory 202 to the cache memory 204.

(Step 6)
After the data transfer to the cache memory 204 is completed, the processor 201 accesses the cache memory 204.

However, the foregoing conventional semiconductor device has the problem that it is likely to be increased in circuit scale. In the cache memory 204, the tags 205 for holding information on addresses and the like are provided in correspondence with the lines A to D each having a capacity of several tens of bytes on a one-to-one basis.

Although the number of the tags 205 shown in FIG. 27 is 4, that of the tags 205 provided in a large-scale integrated circuit is on the order of 1000 so that the scale of a peripheral circuit is increased significantly compared with that of an SRAM (Static Random Access Memory). In addition, the tag comparators 206 as many as the tags 206 are constantly operating so that not only an area but also power consumption are increased significantly.

In the case of using the cache memory 204, it is difficult to expect the cache hit rate. If a given program is executed, the cache hit rate varies depending on the content of the program under processing so that the deterioration of the processing efficiency is unpredictable.

These problems are conspicuous in the case where a processor of built-in type is used and a real time property should be guaranteed, in a development process in a field which necessitates lower power consumption such as mobile equipment, and the like.

SUMMARY OF THE INVENTION

It is therefore an object of the present invention to solve the foregoing conventional problems and achieve a reduction in memory transfer necessary for memory replacement as well as a reduction in power consumption.

To attain the object, the present invention achieves a reduction in circuit scale by composing, in contrast to a normal cache memory composed of so-called lines each having a capacity of about several tens of bytes, a cache memory of lines (the lines according to the present invention will be hereinafter referred to as pages) each having a capacity of about several kilobytes. Since the page having a storage capacity larger than that of a normal line is used, information can be stored in the page by using a relatively easily understandable processing function, e.g., in a unit of program execution that can be managed by an operation system (OS) such as a module, a task, or a thread. This allows easier design of memory replacement scheduling for the page in accordance with the process flow of a program. For the sake of convenience, a unit of program execution that can be managed by the OS will be termed a thread hereinafter.

By using an amount of information transfer in the page which is the target of memory replacement or the value of a memory replacement cycle. as a reference for determining the priorities of the pages at the time of memory replacement, an amount of information transfer and power consumption during the memory replacement can be suppressed. Specifically, a semiconductor device according to the present invention comprises: a processor; a first memory unit accessed by the processor; a plurality of page memory units obtained by partitioning a second memory unit which is accessible by the processor at a speed higher than a speed at which the first memory unit is accessible such that each of the page memory units has a storage capacity larger than a storage capacity of a line composing a cache memory; a tag for adding, to each of the page memory units, tag information indicative of an address value in the first memory unit and priority information indicative of a replacement priority; a tag comparator for comparing, upon receipt of an access request from the processor, the address value in the first memory unit with the tag information held by the tag; and a replacement control unit for replacing respective contents of the page memory units.

The semiconductor device according to the present invention achieves a reduction in the amount of memory transfer necessary for memory replacement. In addition, the set number of the page memory units becomes smaller than the set number of conventional cache memories (lines) so that the number of the tags provided in correspondence with the page memory units is reduced naturally. As a result, the circuit scale can be reduced and the power consumption is reduced accordingly.

Preferably, the semiconductor device according to the present invention further comprises: a distribution managing unit for managing the number of pages allocated to each of the page memory units for each function of an application program executed by the processor.

In the semiconductor device according to the present invention, the plurality of page memory units are preferably assigned to groups each composed of a specified number of page memory units to compose a plurality of bank memories and the semiconductor device preferably further comprises: a bank control unit for managing the plurality of bank memories.

When the semiconductor device according to the present invention comprises a bank control unit for controlling the plurality of bank memories, the replacement control unit preferably determines, upon receipt of an access request to any of the page memory units, whether or not information on a requested address of the page memory unit is held in the tag, selects, if the address information is not held, the one of the plurality of page memory units having a small amount of information transferred between itself and the first memory unit, releases the selected page memory unit, and reads data from the requested address in the released page memory unit.

In this case, the replacement control unit preferably determines, upon receipt of an access request to any of the page memory units, whether or not information on a requested address of the page memory unit is held in the tag, selects, if the address information is not held, one of the plurality of page memory units based on preliminarily specified replacement information, releases the selected page memory unit, and reads data from the requested address in the released page memory unit.

In this case, the replacement control unit preferably determines, upon receipt of an access request to any of the page memory units, whether or not information on a requested address of the page memory unit is held in the tag, selects, if the address information is not held, the one of the plurality of page memory units having a long access cycle, releases the selected page memory unit, and reads data from the requested address in the released page memory unit.

In this case, the replacement control unit preferably evenly redistributes, when an application program to be executed is changed, empty memories to application programs under operation.

In this case, the replacement control unit preferably redistributes, when an application program to be executed is changed, empty memories to application programs under operation based on the priority information preliminarily defined and held in the tag.

In this case, the replacement control unit preferably redistributes, when an application program to be executed is changed, empty memories to application programs under operation in order of increasing operation cycle.

In this case, the replacement control unit preferably redistributes, when an application program to be executed is changed, empty memories to application programs under operation in order of decreasing amount of transfer per unit time.

In this case, upon receipt of a new memory reserve request, the replacement control unit preferably selects and releases the one of the empty memories allocated to the application programs under operation which is in any of the page memory units or in any of the bank memories and has a small amount of information transferred between itself and the first memory unit.

In this case, the replacement control unit preferably performs reservation and release of the page memory units in one operation cycle of the application program, does not reserve any of the empty memory during the cycle, and brings the allocated empty memory into a releasable state one cycle after.

BRIEF DESCRIPTION OF THE DRAWINGS

FIG. 4 is a comparison table in which weights for an amount of information transfer are registered in the semiconductor device according to the embodiment;

FIG. 6 is a flow chart illustrating a third memory replacement method in the semiconductor device according to the embodiment;

FIGS. 7A and 7B illustrate, when an application program is changed in the semiconductor device according to the embodiment, a first redistribution method in a method for redistributing empty memories to application programs including those other than the ones before and after the changing, of which FIG. 7A is a table showing the number of allocated memories before a new empty memory request is issued and FIG. 7B is a table showing the number of allocated memories after the new empty memory request is issued;

FIG. 8 is a flow chart illustrating the first redistribution method when the application program is changed in the semiconductor device according to the embodiment;

FIGS. 9A and 9B illustrate, when an application program is changed in the semiconductor device according to the embodiment, a second redistribution method in a method for redistributing empty memories to application programs including those other than the ones before and after the changing, of which FIG. 9A is a table showing the number of allocated memories before a new empty memory request is issued and FIG. 9B is a table showing the number of allocated memories after the new empty memory request is issued;

FIGS. 11A and 11B illustrate, when an application program is changed in the semiconductor device according to the embodiment, a third redistribution method in a method for redistributing empty memories to application programs including those other than the ones before and after the changing, of which FIG. 11A is a table showing the number of allocated memories before a new empty memory request is issued and FIG. 11B is a table showing the number of allocated memories after the new empty memory request is issued;

FIGS. 13A and 13B illustrate, when an application program is changed in the semiconductor device according to the embodiment, a fourth redistribution method in a method for redistributing empty memories to application programs including those other than the ones before and after the changing, of which FIG. 13A is a table showing the number of allocated memories before a new empty memory request is issued and FIG. 13B is a table showing the number of allocated memories after the new empty memory request is issued;

FIGS. 15A to 15C are conceptual views illustrating an extra memory managing function in the semiconductor device according to the embodiment, of which FIG. 15A shows the state of the bank before a mapping request is issued to the page, FIG. 15B shows the state of the bank after the mapping of the page without an extra attribute, and FIG. 15C shows the state of the bank after the mapping of the page with the extra attribute;

FIGS. 16A to 16D are conceptual views illustrating the extra memory managing function in the semiconductor device according to the embodiment, of which FIG. 16A shows the state of the bank before an un-mapping request is issued to the page without the extra attribute, FIG. 16B shows the state of the bank after the un-mapping request is issued to the page in the case of FIG. 16A, FIG. 16C shows the state of the bank before the un-mapping request is issued to the page with the extra attribute, and FIG. 16D shows the state of the bank after the un-mapping request is issued to the page in the case of FIG. 16C;

FIGS. 17A to 17D are conceptual views illustrating the extra memory managing function in the semiconductor device according to the embodiment, of which FIG. 17A shows the state of the bank before a second or subsequent mapping request is issued to the page without the extra attribute, FIG. 17B shows the state of the bank after the second or subsequent mapping request is issued to the page in the case of FIG. 17A, FIG. 17C shows the state of the bank before the second or subsequent mapping request is issued to the page with the extra attribute, and FIG. 17D shows the state of the bank after the second or subsequent mapping request is issued to the page in the case of FIG. 17C;

FIGS. 18A to 18D are conceptual views illustrating the extra memory managing function in the semiconductor device according to the embodiment in the presence of an EXTRAFREE page in an extra bank, of which FIG. 18A shows the state of the bank before a mapping request is issued to another page without the extra attribute, FIG. 18B shows the state of the bank after the mapping request is issued to the other page in the case of FIG. 18A, FIG. 18C shows the state of the bank before the mapping request is issued to the other page with the extra attribute, and FIG. 18D shows the state of the bank after the mapping request is issued to the other page in the case of FIG. 18C;

FIGS. 19A and 19B are conceptual views illustrating the extra memory managing function in the semiconductor device according to the embodiment in the presence of a FREE page in the extra bank, of which FIG. 19A shows the state of the bank before a mapping request is issued to another page with the extra attribute and FIG. 19B shows the state of the bank after the mapping request is issued to the other page in the case of FIG. 19A;

FIGS. 20A and 20B are conceptual views illustrating the extra memory managing function in the semiconductor device according to the embodiment in the absence of the FREE page in the extra bank, of which FIG. 20A shows the state of the bank before a mapping request is issued to another page with the extra attribute and FIG. 20B shows the state of the bank after the mapping request is issued to the other page in the case of FIG. 20A;

FIGS. 21A and 21B are other conceptual views illustrating the extra memory managing function in the semiconductor device according to the embodiment in the absence of the FREE page in the extra bank, of which FIG. 21A shows the state of the bank before a mapping request is issued to another page with the extra attribute and FIG. 21B shows the state of the bank after the mapping request is issued to the other page in the case of FIG. 21A;

FIG. 22 is a table showing a method for determining a bank for which an extra page is reserved and conditions for the determination of the extra memory managing function in the semiconductor device according to the embodiment;

FIG. 24A is a timing chart illustrating the method for releasing an extra bank of the extra memory managing function in the semiconductor device according to the embodiment;

FIG. 24B is a conceptual view illustrating the method for releasing an extra bank of the extra memory managing function in the semiconductor device according to the embodiment;

FIG. 26A is still another timing chart illustrating the method for releasing an extra bank of the extra memory managing function in the semiconductor device according to the embodiment;

FIG. 26B is still another conceptual view illustrating the method for releasing an extra bank of the extra memory managing function in the semiconductor device according to the embodiment.

DETAILED DESCRIPTION OF THE INVENTION

A description will be given first to terminology used in the embodiments of the present invention.

(1) Pseudo-Cache

A pseudo-cache memory is composed of a plurality of pages each having a capacity of several kilobytes, which is different from a conventional cache memory composed of a plurality of lines each having a capacity of about several tens of bytes. The pseudo-cache is composed of a memory device accessible at a high speed. The pseudo-cache is preferably composed of, e.g., a static random access memory (SRAM) or the like having a relatively small capacity.

(2) Page

A page is a smallest unit of a memory region. A tag required to implement the pseudo-cache memory is allocated to each page in a one-to-one correspondence. The mapping of a main memory space to a pseudo-cache space can be performed on a per page basis.

(3) Bank

A bank is composed of a plurality of pages. The issue of an instruction from a processor to different banks or an access to data therein by the processor and a direct memory access (DMA) transfer between the main memory and the pseudo cache can be performed simultaneously. In the case of simultaneous occurrence of an access from the processor to one bank and an access for transfer between the main memory and the pseudo cache, however, a penalty occurs by which either of the accesses is caused to await or cancelled.

(4) Memory Area

A memory area is a memory region composed of a plurality of banks obtained by associating an object of use, i.e., instructions or data sets to be stored with area units.

Figure 1:
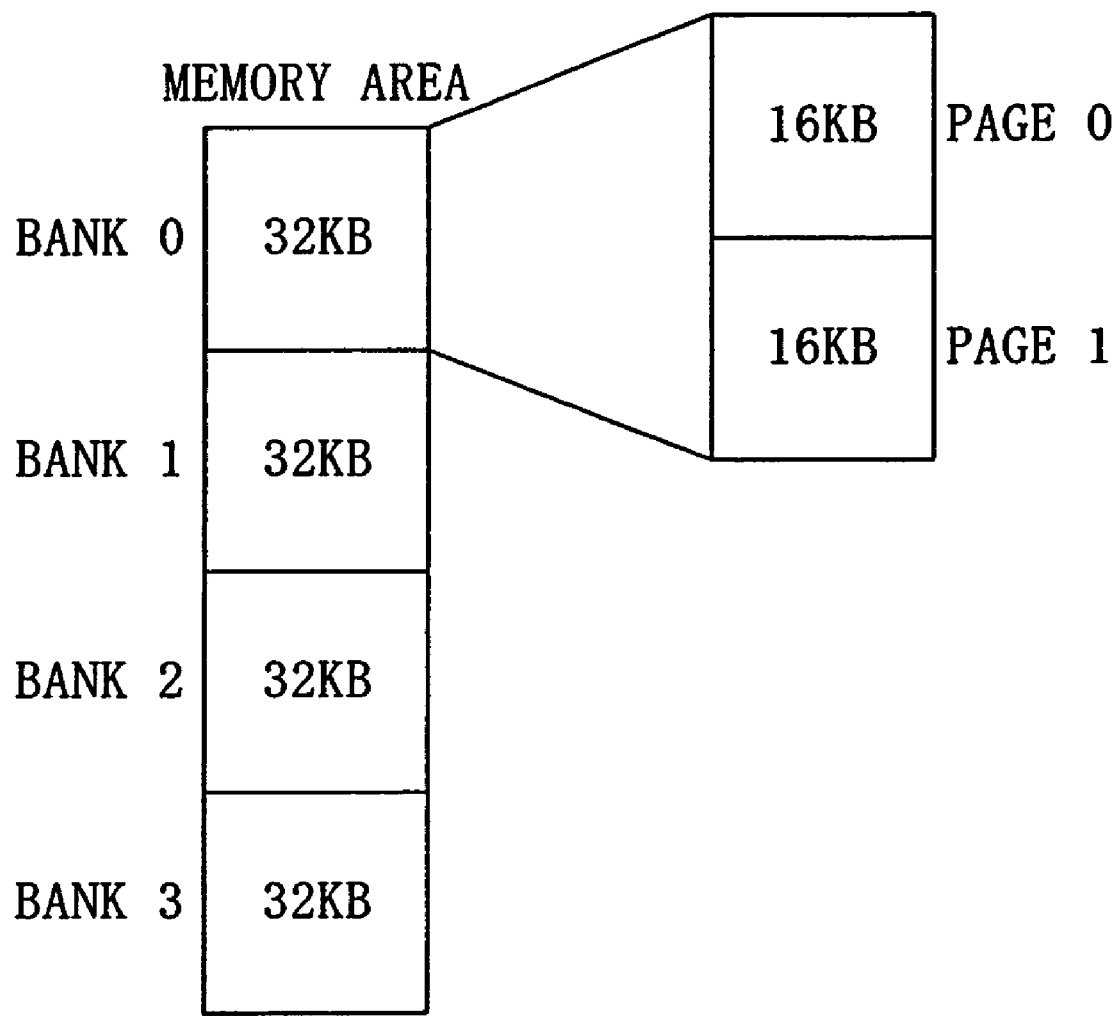
FIG. 1 is a block diagram showing an example of a page, a bank, and a memory area composing a semiconductor device according to an embodiment of the present invention.

FIG. 1 shows an example of the structures of the page, the bank, and the memory area. As shown in FIG. 1, the memory area is a memory region in which each bank is composed of 2 pages and each page has a capacity of 16 kilobytes. It will easily be understood that these structures are only exemplary and not limited to the ones shown in FIG. 1.

A description will be given next to the structure of a semiconductor device according to an embodiment of the present invention with reference to the drawings.

Figure 2:
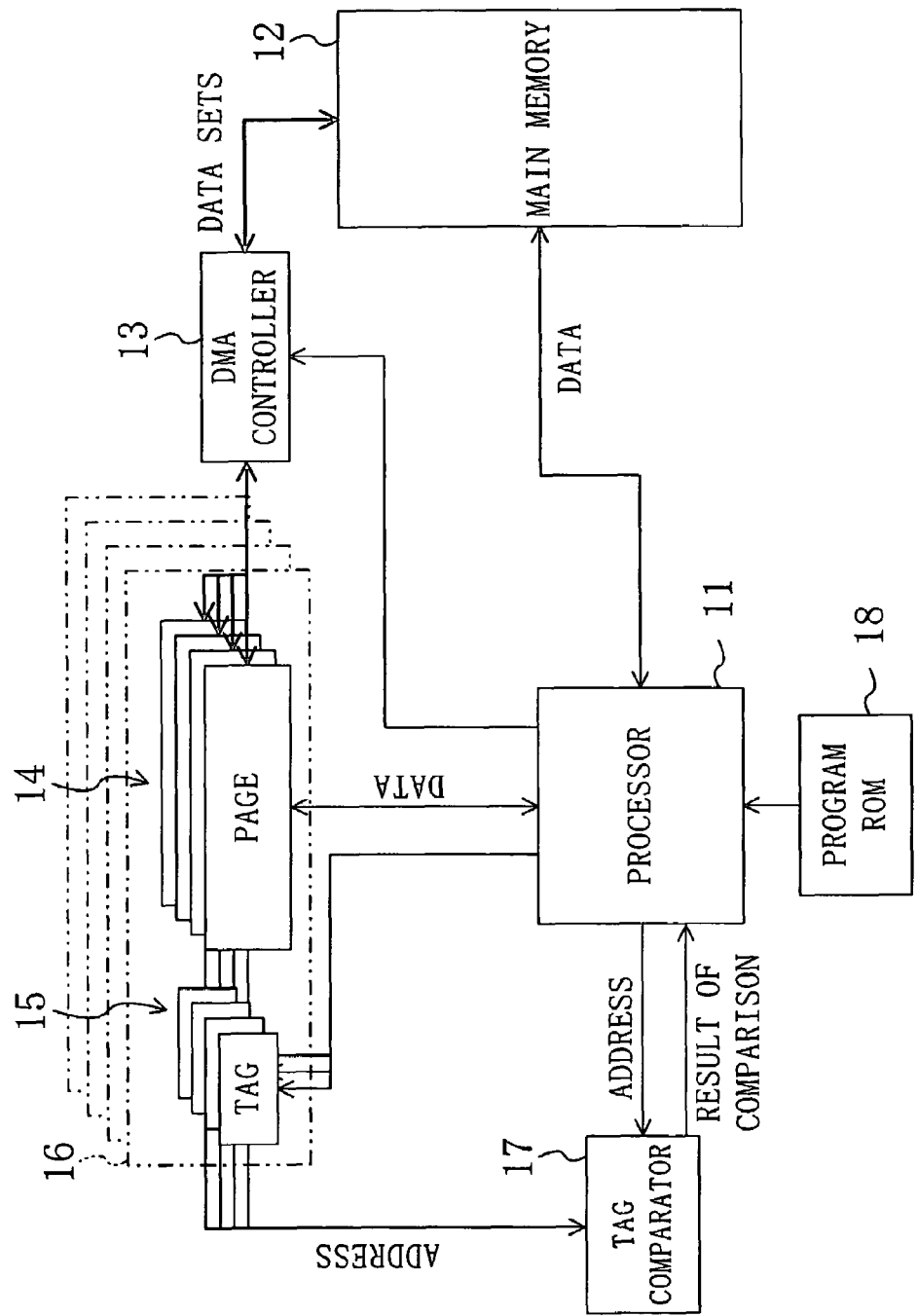
FIG. 2 is a block diagram showing the semiconductor device according to the embodiment.

FIG. 2 shows a block structure in the semiconductor device according to the embodiment. As shown in FIG. 2, the semiconductor device has: a processor 11 for executing a program; a large-capacity main memory 12 which is accessible at a low speed by the processor 11; a DMA (Direct Memory Access) controller 13 for performing data transfer between the main memory 12 and a plurality of pages 14; and the plurality of pages 14 composed of a pseudo-cache memory accessed by the processor 11.

The pages 14 are obtainable by partitioning a pseudo-cache memory such that each of the pages 14 has a capacity of, e.g., 16 kilobytes and a tag 15 for holding information on an address and the like is provided in a one-to-one correspondence with each of the pages 14. Here, a 4-bank configuration is adopted in which the pages 14 are grouped in fours such that each group of four pages 14 constitute one bank 16 and four banks 16 are provided.

The semiconductor device also has a tag comparator 17 for comparing an address to which the processor 11 has issued an access request with the address held by each of the tags 15. If they do not match, the tag comparator 17 requests, of the processor 11, the replacement of address data as a result of comparison.

A pseudo-cache manager 18 as a replacement control unit for effecting access control for the replacement of the respective contents of the pages 14 and a bank managing unit has been connected to the processor 11.

The pseudo-cache manager 18 is a program having a memory managing function of managing and executing the replacement of the pseudo-cache memory and an extra memory managing function of using unused memory regions in the banks 16 and in the pages 14 to enhance a memory use efficiency and suppressing an amount of information transferred between the pseudo-cache and the main memory. The pseudo-cache manager 18 also has a function as a distribution managing unit for managing the number of pages 14 to be allocated for each function of an application program executed by the processor 11. The memory managing function and the extra memory managing function will be described later.

A description will be given herein below to the operation of the semiconductor device thus constructed.

(Step 1)

The processor 11 issues a memory access request.

(Step 2)

The memory address requested by the processor 11 is reported to the tag comparator 17 which examines, through comparison, whether or not the requested address is included in the addresses held by the individual tags 15.

(Step 3)

If the requested address is included in any of the tags 15, the processor 11 accesses the page 14 corresponding to the tag 15 in which the requested address is stored. In this case, the access is established and completed so that Step 4 and the steps subsequent thereto are not performed.

(Step 4)

If the requested address is not included in any of the tags 15, the tag comparator 17 generates comparison result information on an address mismatch and outputs it to the processor 11.

(Step 5)

Based on the comparison result information from the tag comparator 17, the processor 11 gives an instruction of data transfer to the DMA controller 13 in accordance with a program held by the pseudo-cache manager 18. Consequently, the DMA controller 13 transfers a page full of data indicated by the requested address from the main memory 12 to any of the pages 14.

(Step 6)

After the data transfer to the page 14 by the DMA controller 13 is completed, the processor 11 accesses the page 14 to which the data has been transferred.

In this manner, the access to the page 14 by the processor 11 is executed.

A description will be given herein below to the memory managing function and extra memory managing function of the pseudo-cache manager 18.

(Memory Managing Function)

The description will be given first to the memory managing function performed to the banks 16 and to the pages 14.

(1) Bank Managing Function

Memory acquisition and memory release are performed on a per bank basis. That is, the acquisition of the bank 16 is performed in response to a bank reserve request from an application program and the release of the bank 16 is performed in response to a bank release request.

A bank specifier for discriminating among the four banks 16 is allocated to the reserved bank 16 and an operation to the bank 16 is performed by specifying the bank specifier. It is possible to reserve a plurality of banks 16 with one bank reserve request. In this case, the bank specifier is allocated to each of the respective banks 16 on a one-to-one basis. In this respect, the bank specifier is different from a page specifier which will be described later. By issuing a bank information request to the reserved bank 16, the content (bank information) of the requested bank 16 can also be acquired. The bank information includes a bank attribute, a bank state, and the number of FREE pages. The bank attribute is an attribute set at the time of reservation (acquisition) of the bank 16, while the bank state is information indicative of the following states of the bank. The number of FREE pages is the number of those of the pages 14 composing the bank 16 which have not been reserved yet.

The bank states include three states which are a FREE state, an ALLOC state, and an ALLOCDIRTY state.

The FREE state is the state of the bank 16 not reserved by a thread. The bank 16 in the FREE state is termed herein a FREE bank. Once the bank 16 is reserved by the thread, a transition to the ALLOC state is made. Since the ALLOC state is an internal state, it cannot be recognized from the outside.

The ALLOC state is the state of the hank 16 reserved by the thread in which each of the pages 14 composing the bank 16 is in the FREE state. A bank in the ALLOC state is termed an ALLOC bank. If the page 14 is reserved from the ALLOC bank, a transition to the ALLOCDIRTY state is made and the release of the bank 16 causes a transition to the FREE state.

The ALLOCDIRTY state is the state of the bank 16 reserved by the thread in which at least one of the pages 14 composing the bank 16 is not in the FREE state. The bank 16 in the ALLOCDIRTY state is termed an ALLOCDIRTY bank. If each of the pages 14 composing the bank 16 is placed in the FREE state, a transition to the ALLOCK state is made. It is to be noted that an error occurs if bank release is performed with respect to the bank 16 in the ALLOCDIRTY state.

(2) Page

Mapping to the page 14 is performed in response to a mapping request from the thread to the page 14, while unmapping to the page 14 is performed in response to an unmapping request to the page 14.

The mapping to the page 14 is the validation of the mapping of the main memory 12 to a pseudo-cache memory space (region) and the pseudo-cache memory space to which mapping has been performed is termed a pseudo-cache memory page. Specific processes performed during the mapping to the page are the reservation of the page 14 from the bank 16, the transfer (preload) of the content of the main memory 12 to the page 14, and the validation of the tag 15.

The unmapping to the page 14 is the invalidation of the mapping of the main memory 12 to the pseudo-cache memory space. Specific processes performed during the unmapping to the page is the invalidation of the tag 15, the transfer (write-back) of the content of the page 14 to the main memory 12, and the release of the page 14 to the bank 16.

The preload and the write-back are processes for providing synchronization between the page 14 and the main memory 12 and performed only during the mapping to the page and the unmapping to the page. If the content of the main memory 12 is rewritten after the mapping to the page, therefore, the synchronization process (preload) is not performed. The preload and the write-back are performed by a DMA transfer.

As described above, the tags 15 are allocated to the respective pages 14 on a one-to-one basis. If a main memory address is set to one of the four tags 15 to validate the tag, the association of the main memory 12 with the pseudo-cache memory is performed by using the page 14 corresponding to the tag 15, which enables the use of a main memory address as a pseudo-cache memory address. Thereafter, an access to the pseudo-cache memory address identical to the main memory address becomes an access to the page 14 having the tag 15 corresponding to the pseudo-cache memory address. Since an access to the page 14 is higher in speed than an access to the main memory 12, the thread can be executed at a higher speed.

A page specifier is allocated to the pseudo-cache memory page to which mapping has been performed. After the allocation of the page specifier, an operation to the pseudo-cache memory page is performed by specifying the page specifier. During the mapping to the page, it is possible to reserve a plurality of pages 14. In this case, therefore, the pseudo-cache memory page is composed of the plurality of pages 14. However, the allocated page specifier is one, which is different from the bank specifier.

Since the page specifier is referenced according to the address from the management region of the memory managing function, it cannot be copied. In the case of allocating the page specifier already allocated to the pseudo-cache memory page to another pseudo-cache memory page, it is necessary to not only perform unmapping to the page but also verity that the pseudo-cache memory page is in the FREE state, i.e., that the write-back has been completed and then allocate the page specifier to the other pseudo cache memory page.

The attributes of the page 14 composing the pseudo-cache memory page can be set at the time of mapping in response to the mapping request to the page 14.

The page attributes include a preload attribute, a write-back attribute, and an access cycle attribute.

The preload attribute indicates whether or not the content of the main memory 12 should be preloaded in the pseudo-cache memory page upon mapping to the page 14. The preload is performed by a DMA transfer.

The write-back attribute indicates whether or not the content of the page 14 composing the pseudo-cache memory page should be write-backed to the main memory 12 upon unmapping to the page 14. The write-back is performed by a DMA transfer.

The access cycle attribute indicates the cycle of access to the page 14 and is used to determine the length of the cycle through comparison. It is to be noted that the page attributes can be set only upon mapping to the page 14.

Page states include four states which are a FREE state, a PRE-ALLOC state, an ALLOC state, and a PRE-FREE state.

The FREE state is the state of the page not reserved by a thread and not composing the a pseudo-cache memory page. A page in the FREE state is termed a FREE page. Since the FREE state is an internal state, it cannot be recognized from the outside. When mapping to the page 14 is performed, a transition to the PRE-ALLOC state is made.

The PRE-LLOC state is the state of the page 14 composing the pseudo-cache memory page to which mapping has been performed but the preload has not been completed yet. A page in the PRE-ALLOC state is termed a PRE-ALLOC page. If the preload attribute has not been set, a transition to the ALLOC state is made after validating the tag 15. If the preload attribute has been set, a transition to the ALLOC state is made after performing the preload and the validation of the tag 15.

The ALLOC state is the state of the page composing an accessible pseudo-cache memory page. A page in the ALLOC state is termed an ALLOC page. When unmapping to the page 14 is performed, a transition to the PRE-FREE state is made after invalidating the tag 15.

The PRE-FREE state is the state of the page 14 composing the pseudo-cache memory page to which unmapping has been performed but the write-back has not been completed yet. A page in the PRE-FREE state is termed a PRE-FREE page. If the write-back attribute has not been set, a transition to the FREE state is made after performing unmapping to the page. If the write-back attribute has been set, a transition to the FREE state is made after performing the write-back and the unmapping to the page.

A description will be given herein to a pseudo-cache miss exception.

If the preload attribute is set upon mapping to the page in response to the mapping request, the preload occurs. If a pseudo-cache memory address in the page is accessed before the preload is completed, a cache miss exception occurs. If the cache miss exception occurs, the execution of the thread is halted until the preload is completed. To prevent the occurrence of the cache miss exception, it is appropriate to verify that the page composing the pseudo-cache memory page is in the ALLOC state and then access the address held by the pseudo-cache memory page.

Since the memory managing function according to the present embodiment does not have the function of mapping a new page to the address with the cache miss, it is necessary for the thread to perform the mapping of the page to the address with the cache miss.

As specific examples of the memory managing function according to the present embodiment, three memory replacement methods will be described herein below.

(1st Memory Replacement Method)

Referring to the drawings, a first memory replacement method which adds the weighing of an amount of information transfer to the foregoing memory managing function will be described herein below.

Figure 3:
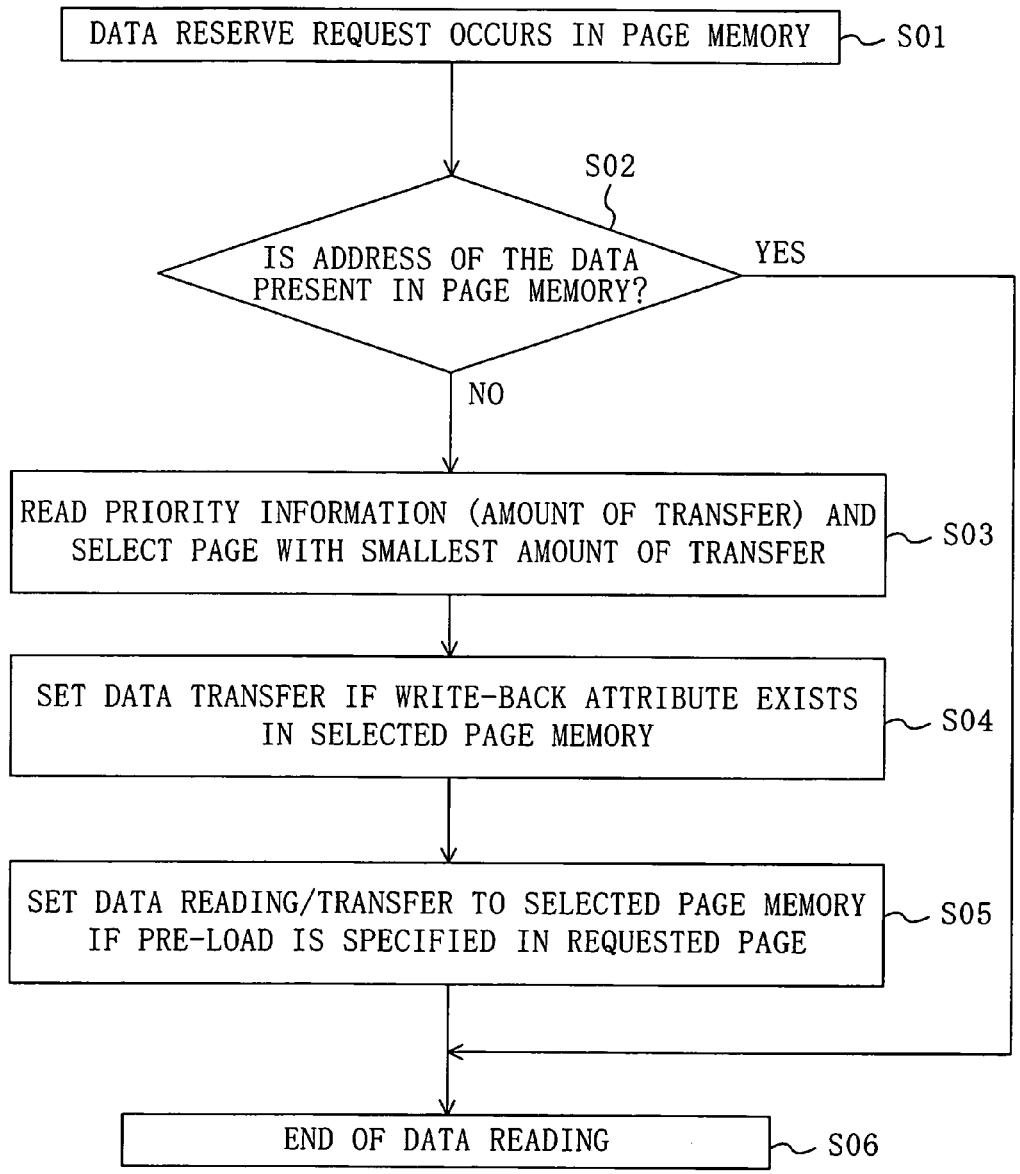
FIG. 3 is a flow chart illustrating a first memory replacement method in the semiconductor device according to the embodiment.

FIG. 3 shows the process flow of the first method replacement method for the semiconductor device according to the present embodiment.

First, as shown in FIG. 3, it is assumed that a page mapping request is issued from the thread in Step S01.

Next, in Step S02, it is determined by using the tag comparator 17 whether or not the address of the data requested in Step S01 is present (held) in the respective tags 15 of the pages 14. If the requested address is present in any of the tags 15 (which is termed a tag match), it follows that the requested data is held in the page 14. Accordingly, the whole process moves, without performing memory replacement, to the final Step S06 where the data is read from the corresponding page 14 and the whole process is thereby completed.

If the requested address is not present in any of the tags 15 (which is termed a tag mismatch), the presence or absence of the preload attribute and the write-back attribute as the page attributes is determined in the subsequent Step S03, a weight for the amount of information transfer is determined in a comparison table shown in FIG. 4, and the page 14 with a smallest weight value is selected. For example, the weight value when each of the write-back attribute and the preload attribute is absent is 0 and the weight value when either of the write-back attribute and the preload attribute is present is 1, while the weight value when each of the two attributes is present is 2, as shown in FIG. 4.

Next, in Step S04, if the page 14 selected in Step S03 has the write-back attribute, a DMA transfer requesting the write-back is set to the DMA controller 13. Then, the page state is shifted to the PRE-FREE state and the completion of the data transfer is awaited.

Next, in Step S05, if the page 14 to which the mapping request has been issued has the preload attribute after the data transfer (information transfer) in Step S04 is completed, a DMA transfer requesting the preload is set to the DMA controller 13. Then, a transition to the PRE-ALLOC state is further made and the completion of the data transfer is awaited.

Next, in Step S06, the page state is shifted to the ALLOC state after the completion of the data transfer in Step S05 and data is read from the corresponding page 14, whereby the whole process is completed.

Thus, the first memory replacement method replaces the page 14 by using an amount of data transfer (amount of information transfer) as a criterion for determination. Although the amount of information transfer is expressed as simple information of the presence or absence of the preload and the write-back, it is also possible to use a specific number of bytes transferred, e.g., a value of 3 kilobytes or the like as a criterion for determining priorities. In this case also, the sum of the amount of information transferred for the preload and the amount of information transferred for the write-back serves as a criterion value for determining the priorities.

(2nd Memory Replacement Method)

A description will be given next to a second memory replacement method using replacement information specified preliminarily with reference to the drawings.

Figure 5:
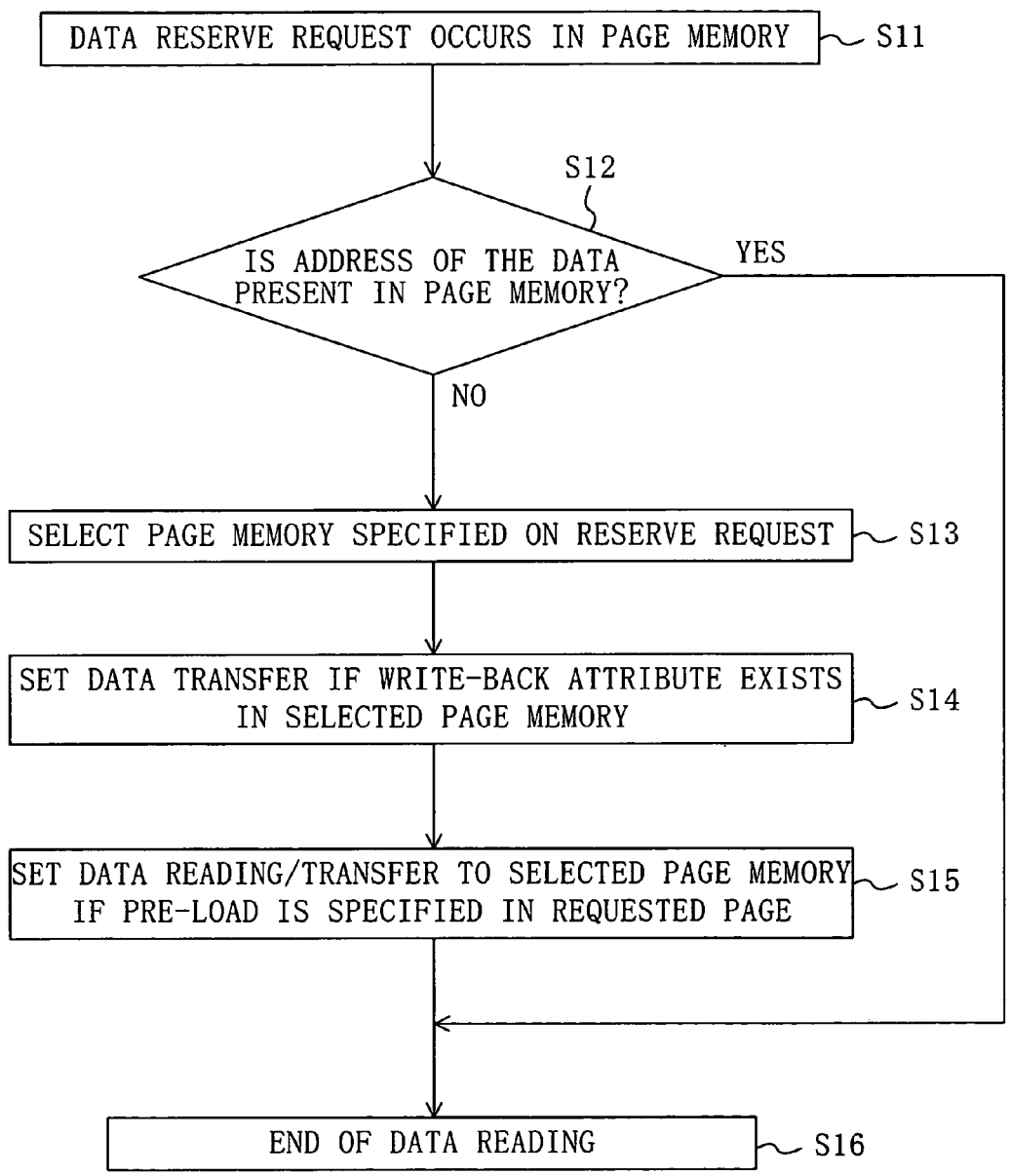
FIG. 5 is a flow chart illustrating a second memory replacement method in the semiconductor device according to the embodiment.

FIG. 5 shows the process flow of the second replacement method for the semiconductor device according to the present embodiment.

A mapping request to the page 14 has been set preliminarily to the pseudo-cache manager 18 such that the page 14 to be reserved is specified in the event of a page memory reserve request.

As shown in FIG. 5, it is assumed that a page mapping request is issued from the thread in Step S11.

Next, in Step S12, it is determined by using the tag comparator 17 whether or not the address of the data requested in Step S11 is present in the respective tags 15 of the pages 14. If the requested address is present in any of the tags 15, the resultant tag match is synonymous with the holding of the requested data in the page 14 so that the whole process moves, without performing memory replacement, to the final Step S16 where the data is read from the corresponding page 14 and the whole process is thereby completed.

In the case of a tag mismatch, the page 14 specified simultaneously with the mapping request is selected in the subsequent Step S13.

Next, in Step S14, if the page 14 selected in Step S13 has the write-back attribute, a DMA transfer requesting the write-back is set to the DMA controller 13. Then, the page state is shifted to the PRE-FREE state and the completion of the data transfer is awaited.

Next, in Step S15, if the page 14 to which the mapping request has been issued has the preload attribute after the data transfer in Step S14 is completed, a DMA transfer requesting the preload is set to the DMA controller 13. Then, a transition to the PRE-ALLOC state is further made and the completion of the data transfer is awaited.

Next, in Step S16, the page state is shifted to the ALLOC state after the completion of the data transfer in Step S15 and data is read from the corresponding page 14, whereby the whole process is completed.

Thus, the second memory replacement method replaces the page 14 by preliminarily setting information on the replacement of the page 14 to the pseudo-cache manager 18 and managing the replacement information.

Although the page 14 is selected upon a transfer request, the process is not limited thereto. A table reference process may also be performed instead in which the page 14 as a replacement target is preliminarily registered in a table and the table is referenced with a proper timing.

(3rd Memory Replacement Method)

A description will be given next to a third memory replacement method using the access cycle attribute of the page attributes in the memory managing function with reference to the drawings.

FIG. 6 shows the process flow of the third memory replacement method for the semiconductor device according to the present embodiment.

As the access cycle attribute included in the page attributes of each of the pages 14, information on a specified cycle is set herein in the event of a mapping request.

As shown in FIG. 6, it is assumed that a page mapping request is issued from the thread in Step S21.

Next, in Step S22, it is determined by using the tag comparator 17 whether or not the address of the data requested in Step S21 is present in the respective tags 15 of the pages 14. If the requested address is present in any of the tags 15, the resultant tag match is synonymous with the holding of the requested data in the page 14 so that the whole process moves, without performing memory replacement, to the final Step S26 where data is read from the corresponding page 14 and the whole process is thereby completed.

In the case of a tag mismatch, that one of the pages 14 to which mapping has been performed and which has a longest cycle set as the access cycle attribute is selected in the subsequent Step S23.

Next, in Step S24, if the page 14 selected in Step S23 has the write-back attribute, a DMA transfer requesting the write-back is set to the DMA controller 13. Then, the page state is shifted to the PRE-FREE state and the completion of the data transfer is awaited.

Next, in Step S25, if the page 14 to which the mapping request has been issued has the preload attribute after the data transfer (information transfer) in Step S24 is completed, a DMA transfer requesting the preload is set to the DMA controller 13. Then, a transition to the PRE-ALLOC state is further made and the completion of the data transfer is awaited.

Next, in Step S26, the page state is shifted to the ALLOC state after the completion of the data transfer in Step S25 and data is read from the corresponding page 14, whereby the whole process is completed.

Thus, the third memory replacement method preferentially replaces the page 14 having a longest cycle set as the access cycle attribute of the page attributes.

(Empty Memory Distribution Method)

A description will be given next to a method for redistributing, when an application program (hereinafter simply referred to as an application) is changed, empty memories (FREE banks) to applications including those other than the ones before and after the changing with reference to the drawings.

(1) Even Distribution Method

A first redistribution method evenly redistributes the empty memories to the individual applications in the event of an application change.

First, in the state in which ten empty memories are present, it is assumed that four empty memories have been allocated to a first application (A), three empty memories have been allocated to a second application (B), and three empty memories have been allocated to a third application (C), as shown in FIG. 7A.

If it is assumed that a fourth application (D) has issued an empty memory request with a given timing, the number of memories for each of the four applications becomes 2.5. However, since a memory (page) cannot be divided, three memories are allocated to each of the first and second applications (A) and (B), while two memories are allocated to each of the third and fourth applications (C) and (D), as shown in FIG. 7B.

FIG. 8 shows a typical process flow in accordance with the first redistribution method.

As shown in FIG. 8, if it is assumed that an empty memory request is issued from a new application in Step S31, the number of empty memories (average value) for each of the applications is calculated in the subsequent step S32 from the number of applications to which memories have already been allocated and the number of new applications.

Next, in Steps S33, S34, and S35, the average number of empty memories are allocated to each of the applications. If the average number is not an integer, the rounding up or down of the average value is performed with respect to an application which requires the round-up or -down operation.

Since an allocation rule in accordance with the first redistribution method is thus simple, easier mounting can be performed.

(2) Priority-Based Distribution Method

A second redistribution method redistributes empty memories to the individual applications according to the respective priorities of the applications in the event of an application change.

First, in the state in which ten empty memories are present, it is assumed that four empty memories have been allocated to a first application (A) with a priority of 1 (a smaller number or value indicates a higher priority), four empty memories have been allocated to a second application (B) with a priority of 2, and two empty memories have been allocated to a third application (C) with a priority of 3, as shown in FIG. 9A. Here, each of the priorities is held in the corresponding one of the tags 15 and a desirable number of memories (desired number of memories) given to each of the applications (A) to (C) is assumed to be 4.

It is assumed that a fourth application (D) with a priority of 1, of which the number of memories desired is 4, has issued an empty memory request with a given timing.

A comparison is made between the desired number of memories to be allocated to each of the applications and the number of yet unallocated empty memories in order of decreasing priority and memories are allocated to each of the applications based on the smaller one of the numbers. Consequently, four memories are allocated here to each of the first and fourth applications (A) and (D) and two memories are allocated to the second application (B), while no empty memory is allocated to the third application (C) with the lowest priority of 3, as shown in FIG. 9B.

Figure 10:
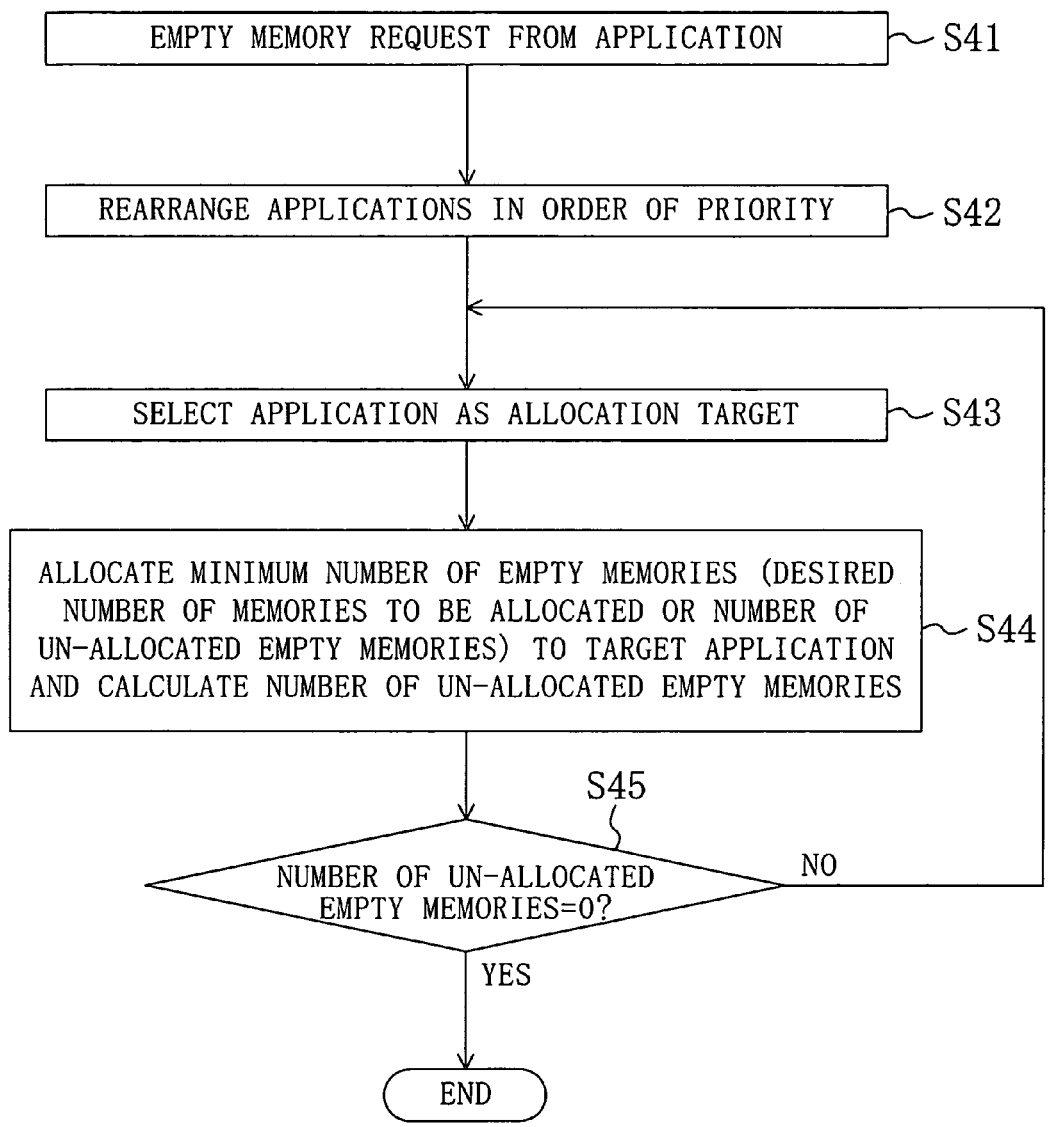
FIG. 10 is a flow chart illustrating the second redistribution method when the application program is changed in the semiconductor device according to the embodiment.

FIG. 10 shows a typical process flow in accordance with the second redistribution method.

As shown in FIG. 10, if it is assumed that an empty memory request is issued from a new application in Step S41, the new application and the applications to which memories have already been allocated are rearranged in the subsequent step S42 in order of decreasing priority, i.e., in order of increasing priority value.

Next, in Steps S43, S44, and S45, the empty memories are allocated to each of the applications based on the smaller one of the desired number of memories to be allocated and the number of unallocated empty memories in the order rearranged.

Since the second redistribution method thus increases the probability of allocating an empty memory to that one of the applications which most urgently requires the empty memory, the efficiency with which memories are used is improved.

(3) Operation-Cycle-Based Distribution Method

A third redistribution method redistributes empty memories to the individual applications according to the respective operation cycles of the applications in the event of an application change.

Figures 11A, 11B:

First, in the state in which ten empty memories are present, it is assumed that four empty memories have been allocated to a first application (A) with an operation cycle of 20 ms, four empty memories have been allocated to a second application (B) with an operation cycle of 30 ms, and two empty memories have been allocated to a third application (C) with an operation cycle of 60 ms, as shown in FIG. 11A. Here, a desired number of memories given to each of the applications (A) to (C) is assumed to be 4.

It is assumed that a fourth application (D) with an operation cycle of 20 ms, of which the number of memories desired is 4, has issued an empty memory request with a given timing. A comparison is made between the desired number of memories to be allocated to each of the applications and the number of yet unallocated empty memories in order of increasing operation cycle and memories are allocated to each of the applications based on the smaller one of the numbers. Consequently, four memories are allocated here to each of the first and fourth applications (A) and (D) and two memories are allocated to the second application (B), while no empty memory is allocated to the third application (C) with the longest operation cycle of 60 ms, as shown in FIG. 11B.

Figure 12:
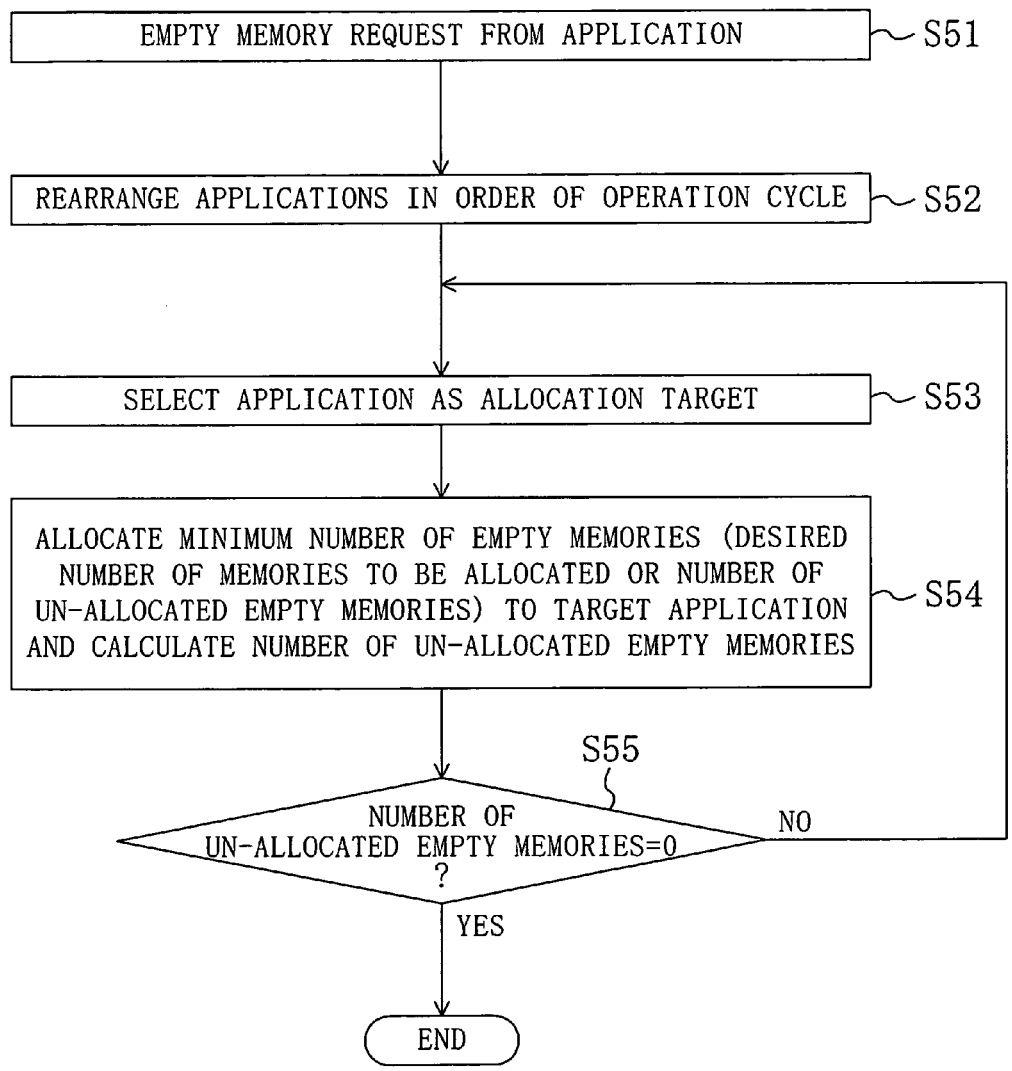
FIG. 12 is a flow chart illustrating the third redistribution method when the application program is changed in the semiconductor device according to the embodiment.

FIG. 12 shows a typical process flow in accordance with the third redistribution method.

As shown in FIG. 12, if it is assumed that an empty memory request is issued from a new application in Step S51, the new application and the applications to which memories have already been allocated are rearranged in the subsequent step S52 in order of increasing operation cycle.

Next, in Steps S53, S54, and S55, the empty memories are allocated to each of the applications based on the smaller one of the desired number of memories to be allocated and the number of unallocated empty memories in the order rearranged.

Since the operation cycle of each of the applications is normally determined uniquely in a real-time process, the operation cycle serving as a criterion for determination can be determined easily in accordance with the third redistribution method.

(4) Amount-of-Information-Transfer-Based Distribution Method

A fourth redistribution method redistributes empty memories to the individual applications according to an amount of information transferred per unit time in the event of an application change.

First, in the state in which ten empty memories are present, it is assumed that four empty memories have been allocated to a first application (A) of which an amount of information transferred per unit time is 3, four empty memories have been allocated to a second application (B) of which an amount of information transferred per unit time is 2, and two empty memories have been allocated to a third application (C) of which an amount of information transferred per unit time is 1, as shown in FIG. 13A. Here, a desired number of memories given to each of the applications (A) to (C) is assumed to be 4.

It is assumed that a fourth application (D), of which an amount of information transferred per unit time is 3 and the number of memories desired is 4, has issued an empty memory request with a given timing. A comparison is made between the desired number of memories to be allocated to each of the applications and the number of yet unallocated empty memories in order of decreasing amount of information transfer and memories are allocated to each of the applications based on the smaller one of the numbers. Consequently, four memories are allocated here to each of the first and fourth applications (A) and (D) and two memories are allocated to the second application (B), while no empty memory is allocated to the third application (C) of which an amount of information transfer is 1 and smallest, as shown in FIG. 13B.

Figure 14:
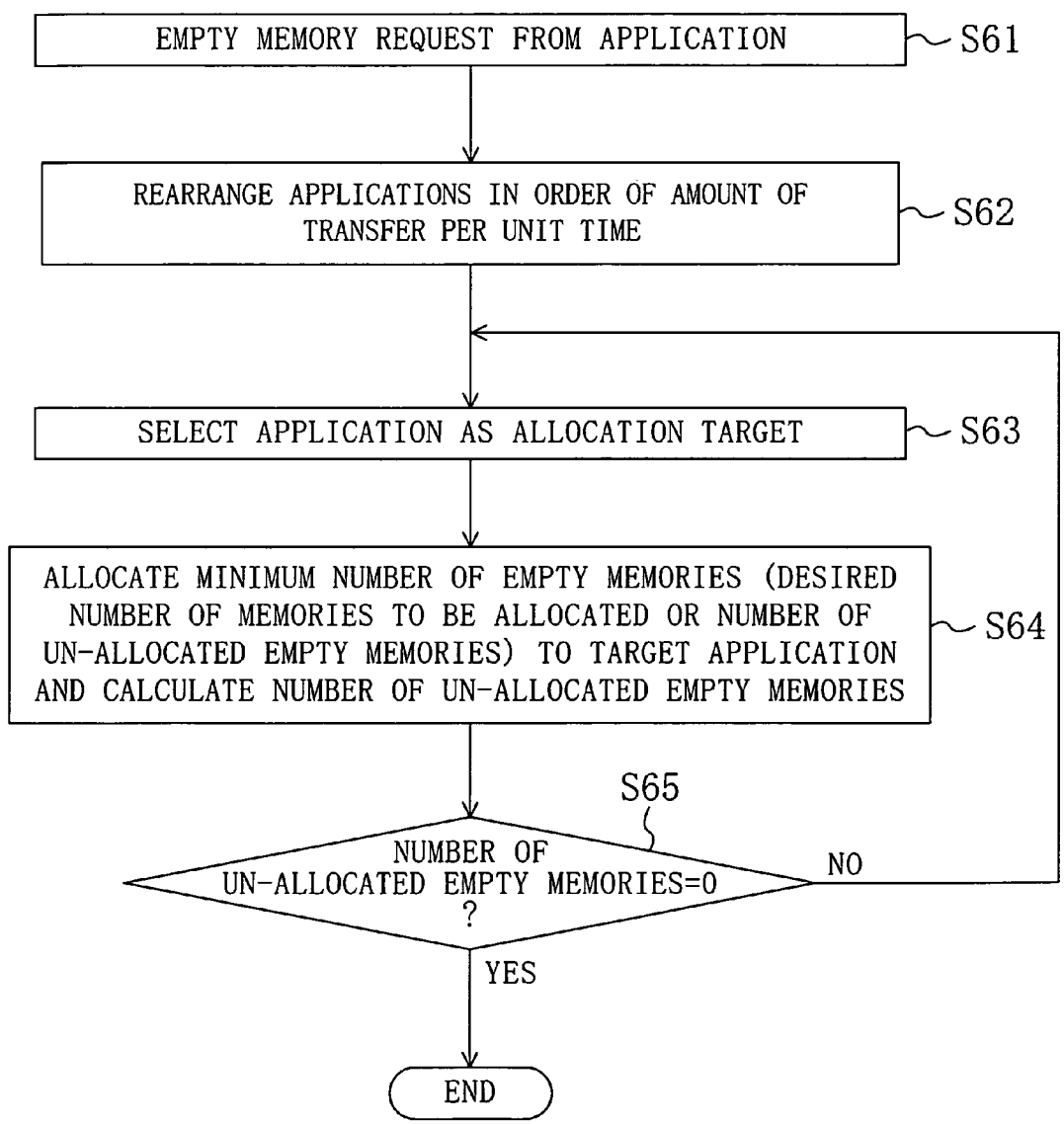
FIG. 14 is a flow chart illustrating the fourth redistribution method when the application program is changed in the semiconductor device according to the embodiment.

FIG. 14 shows a typical process flow in accordance with the fourth redistribution method.

As shown in FIG. 14, if it is assumed that an empty memory request is issued from a new application in Step S61, the new application and the applications to which memories have already been allocated are rearranged in the subsequent step S62 in order of decreasing amount of information transferred per unit time.

Next, in Steps S63, S64, and S65, the empty memories are allocated to each of the applications based on the smaller one of the desired number of memories to be allocated and the number of unallocated empty memories in the order rearranged.

Since the fourth redistribution method allocates the empty memories to the applications in order of decreasing amount of information transfer, the amount of information transfer of the application which requires the preload or the write-back is reduced so that the amount of information transfer during a DMA transfer is suppressed.

(Extra Memory Managing Function)

A description will be given next to the extra memory managing function capable of reducing an amount of information transfer.

An extra memory is defined herein as a FREE bank not reserved by an application.

Hence, the extra memory managing function is the function of reducing an amount of information transfer during a DMA transfer involved in the preload attribute or the write-back attribute as the page attribute by effectively using empty memories to be distributed to an application which requires a FREE bank and performing page caching.

The page caching is defined herein as preserving the content of the page 14 upon unmapping to the page without discarding it by only invalidating the tag information of the page 14. This allows, if mapping to a page is performed by specifying the same memory portion in the main memory 12 and the corresponding page 14 has been cached, mapping to the page by only validating the tag 15 thereof. As a result, the processes of mapping and unmapping to the page can be performed at a higher speed.

The extra memory managing function can be validated by only setting, to the bank 16, an attribute indicative of a FREE bank and an attribute to the page 14.

A description will be given herein below to the extra memory managing function through a comparison between the case with the extra attribute and the case without the extra attribute. Subsequently, the individual attributes and states of the page 14 to which the extra attribute has been set and of the bank 16 to be used will be described as the details of the extra memory managing function.

(1st Mapping to Page)

An operation during the first mapping to a page will be described first with reference to FIGS. 15A to 15C.

In FIG. 15A, it is assumed that a page mapping request specifying a bank 101 in which each of the pages belonging to the bank is in the FREE state is issued.

Next, as shown in FIG. 15B, a page ($A_0$) to which the extra attribute has not been set is acquired (reserved) by a bank in the state 101 (independent bank) in response to the mapping request so that the first FREE page becomes an ALLOC page ($A_0$) and the bank shifts to a state 102.

By contrast, as shown in FIG. 15C, if a mapping request is issued to a page ($A_1$) to which the extra attribute has been set by specifying a bank in the state 101, the presence or absence of a bank in the FREE state and the number of banks possessed by the independent bank specified on the page mapping request are determined. If a bank in the FREE state exists and the banks possessed by the independent bank is not exceeding the maximum number of banks that can be possessed by the independent bank (no possessed bank exists in this first mapping), the bank in the FREE state becomes a bank possessed by the independent bank. The bank possessed by the independent bank is termed herein an extra bank.

Next, a bank from which a page is acquired is determined. Target banks are the independent bank and the extra banks possessed by the independent bank. A method for determining a bank from which a page is acquired will be described later.

Next, a page is acquired from a bank satisfying requirements and the preload and the validation of the tag 15 are performed. As a result, the independent bank shifts to a state 103 after the mapping request is issued to the page to which the extra attribute has been set, while the extra bank possessed by the independent bank shifts to a state 104.

A pseudo-cache memory page to which the extra attribute has been set is termed herein an extra page. The page composing the extra page to which mapping has been performed and which has had the tag 15 validated shifts to the EXTRA state. A page in the EXTRA state is termed an EXTRA page.

(Unmapping to Page)

An operation during unmapping to a page will be described next with reference to FIGS. 16A to 16D.

If an unmapping request is issued to the page ($A_0$) to which the extra attribute has been set, the page ($A_0$) is released to shift to the FREE state, as shown first in FIG. 16A. Accordingly, the bank shifts to the state 101 after the unmapping request is issued to the page ($A_0$), as shown in FIG. 16B.

By contrast, if an unmapping request is issued to the page ($A_1$) to which the extra attribute has been set by specifying a independent bank in the state 103, as shown in FIG. 16C, the page ($A_1$) in the extra bank possessed by the independent bank has the tag 15 invalidated so that the page ($A_1$) shifts to a cached EXTRAFREE state, as shown in FIG. 16D. A page in the EXTRAFREE state is termed an EXTRAFREE page. Even to the page composing the extra page to which the write-back attribute has been set, the write-back is not performed. Accordingly, the independent bank shifts to a state 106 after the unmapping request is issued to the page to which the extra attribute has been set, while the extra bank possessed by the independent bank shifts to a state 107.

(2nd or Subsequent Mapping to Page)

An operation during the second or subsequent mapping to a page will be described next with reference to FIGS. 17A to 17D.

If the second mapping request is issued to the page ($A_0$) to which the extra attribute has not been set by specifying a bank in the state 101, as shown in FIG. 17A, the page ($A_0$) is acquired from the bank in the state 101, as shown in FIG. 17B, so that the bank shifts to the state 102 after the mapping request is issued to the page ($A_0$). Heretofore, the operation has been the same as in the first mapping.

By contrast, if the second mapping request is issued to the page ($A_1$) to which the extra attribute has been set by specifying an independent bank in the state 106, as shown in FIG. 17C, it is determined whether or not the requested content has been cached in the independent bank or in the page ($A_1$) composing the extra bank in the state 107 possessed by the independent bank. In other words, the presence or absence of an EXTRAFREE page is examined. A condition for a cache hit will be described later.

If it has been cached, mapping to the page ($A_1$) can be performed by only validating the tag 15, as shown in FIG. 17D. If it has not been cached, on the other hand, a bank from which a page is acquired is determined in the same manner as in the first mapping to the page, the page is acquired from the determined bank, and the mapping of the main memory 12 is performed subsequently. If the preload attribute has been set, a preload process is performed.

Accordingly, the independent. bank shifts to the state 103 after the second or subsequent mapping request is issued to the page to which the extra attribute has been set, while the extra bank possessed by the independent bank shifts to the state 104.

A description will be given next to an operation in each of the following four cases where mapping is performed to a page ($B_0$ or $B_1$) other than the pages ($A_0$ and $A_1$) to which mapping has already been performed.

(1) When EXTRAFREE Page Exists in Extra Bank

A first case in which mapping is performed to a page ($B_0$ or $B_1$) in addition to the page ($A_0$ or $A_1$) will be described with reference to FIGS. 18A to 18D.

As shown in FIG. 18A, if a mapping request is issued to the page ($B_0$) to which the extra attribute has not been set by specifying a bank in the state 102, the page ($B_0$) is acquired from the bank in the state 102 so that the bank shifts to the state 109 after the mapping request is issued to the page ($B_0$), as shown in FIG. 18B.

By contrast, if a mapping request is issued to the page ($B_1$) to which the extra attribute has been set by specifying an independent bank in the state 103, as shown in FIG. 18C, it is determined whether or not the requested content has been cached in the independent bank in the state 103 or in the page composing the extra bank possessed by the independent bank. If it has been cached, mapping can be performed to the page ($B_1$) by only validating the tag 15. It is assumed here that the page ($B_1$) has been cached in the extra bank in the state 108 possessed by the independent bank. Consequently, the independent bank shifts to a state 110 having two FREE pages after the mapping request is issued to the page ($B_1$), as shown in FIG. 18D, while the extra banks possessed by the independent bank shifts to a state 111 having the EXTRA pages ($A_1$) and ($B_1$).

(2) When FREE Page Exists in Extra Bank

A second case in which mapping is performed to the page ($B_1$) in addition to the page ($A_1$) will be described with reference to FIGS. 19A and 19B. In the second case to a fourth case, the description will be given only to a page to which the extra attribute has been set.

Figure 19A:
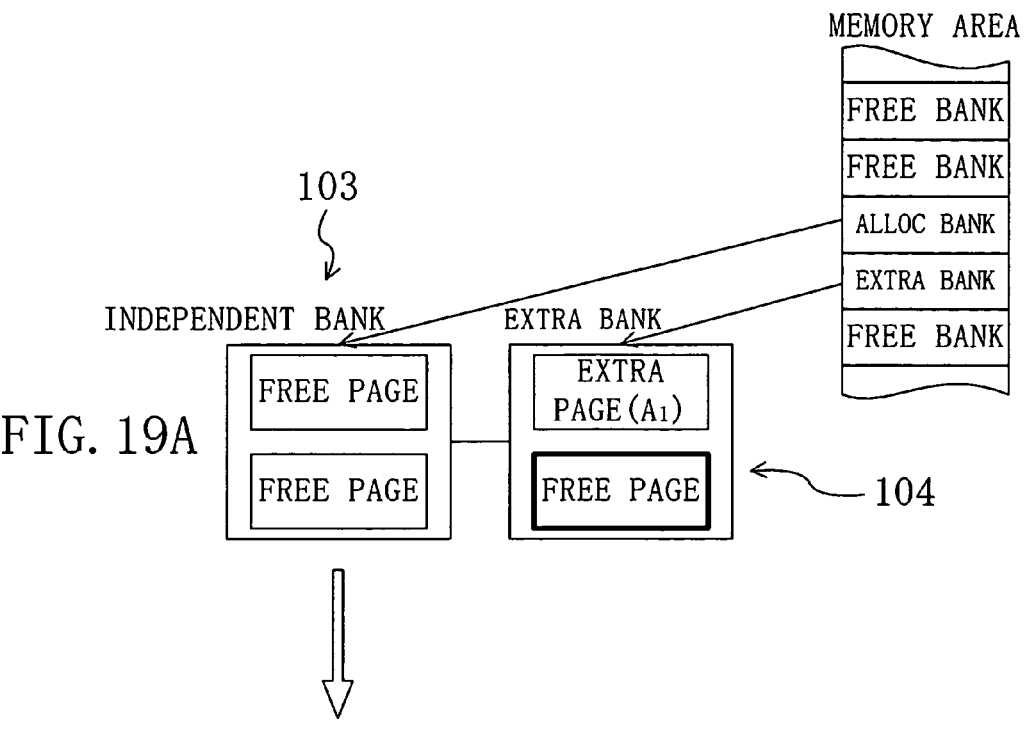
Figure 19B:
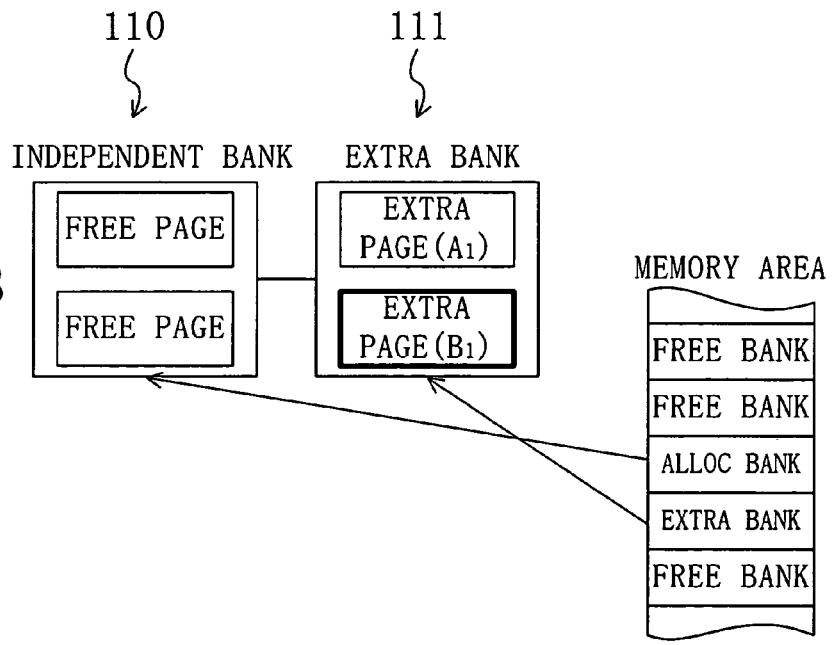

As shown in FIG. 19A, if a page composing an extra bank has not been cached in the second case, an attempt is made to acquire the number of pages requested by the extra bank possessed by the independent bank in the state 103. It is assumed that the independent bank has already possessed the extra bank in the state 104, which is different from the situation in the first mapping to the page. Here, one page can be acquired from the extra bank. Consequently, the independent bank shifts to the state 110 having two FREE pages after the mapping to the page ($B_1$) is performed, as shown in FIG. 19B, while the extra bank possessed by the independent bank shifts to the state 111 having the extra pages ($A_1$) and ($B_1$).

(3) When FREE Page Does not Exist in Extra Bank

A third case in which mapping is performed to the page ($B_1$) in addition to the page ($A_1$) will be described with reference to FIGS. 20A and 20B.

Figure 20A:
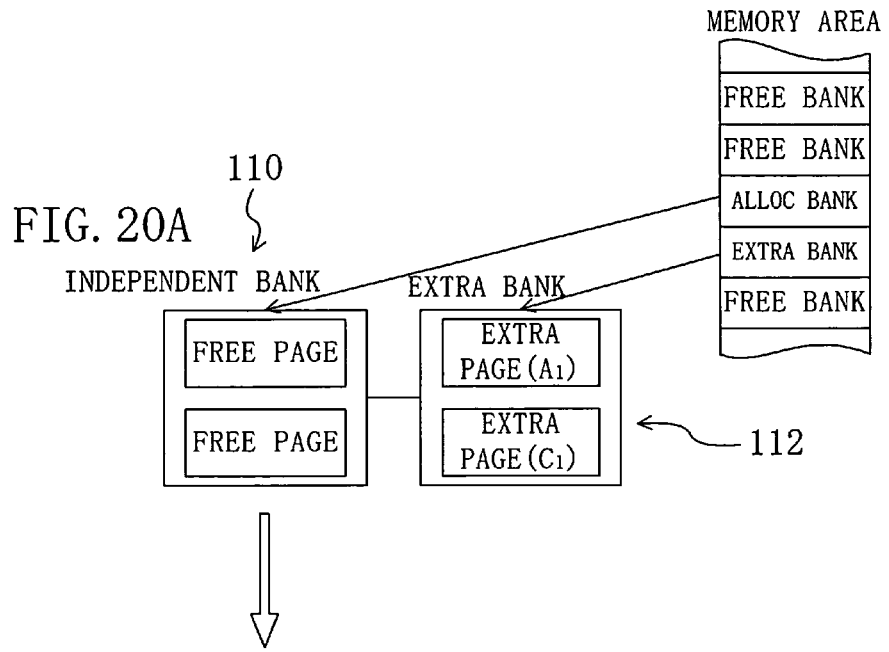
Figure 20B:
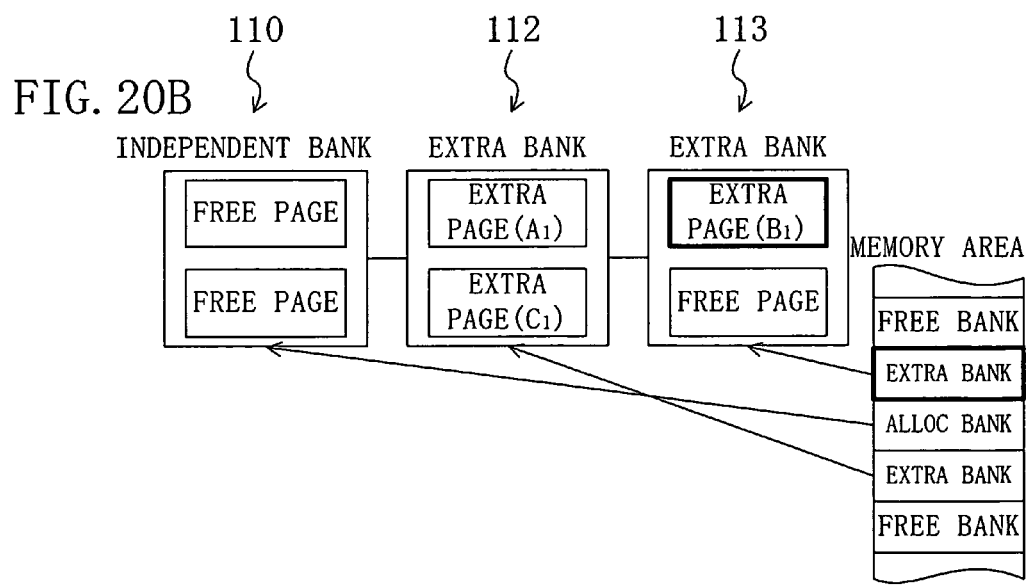

As shown in FIG. 20A, if a FREE page does not exist in an extra bank in a state 112 already possessed by an independent in the state 110 and hence mapping cannot be performed any more, an attempt is made to acquire a new extra bank. The presence or absence of a bank in the FREE state and the number of banks possessed by a bank specified upon calling are determined in the same manner as in the first mapping to the page. As a result, if there is a bank in the FREE state and the number of banks possessed by the independent bank is not exceeding the maximum number of banks that can be possessed, another bank in the FREE state is acquired and possessed as a new extra bank, the page ($B_1$) is acquired from the bank, the preload process is performed, and the tag 15 is validated. In the third case, therefore, the independent bank shifts to the state 110 having two FREE pages after the mapping to the page ($B_1$) is performed, as shown in FIG. 20B, while the two extra banks possessed by the independent bank shifts to a state 112 having the extra pages ($A_1$) and ($C_1$) and to a state 113 having the extra page ($B_1$) and a FREE page, respectively.

(4) When FREE Page Does not Exist in Extra Bank

A fourth case in which mapping to the page ($B_1$) is performed in addition to the page ($A_1$) will be described with reference to FIGS. 21A and 21B.

As shown in FIG. 21A, if it has been impossible to acquire a new extra bank, which is different from the third case, the page ($B_1$) is acquired from an independent bank in the state 110, not from an extra bank in the state 112. Then, the preload process is performed and the tag 15 is validated. In the fourth case, therefore, the independent bank shifts to a state 114 having the EXTRA page ($B_1$) and a FREE page after the mapping to the page ($B_1$) is performed, as shown in FIG. 21B, while the extra bank possessed by the independent bank shifts to the state 112 having the EXTRA pages ($A_1$) and ($C_1$).

A description will be given herein below to control information necessary for the extra memory managing function.

A bank attribute can be set to each of the banks 16 as extra banks in response to a bank attribute setting request. Therefore, the extra memory managing function is validated for the bank 16 to which the extra attribute has been set in addition to the bank attribute and the acquisition of a page for which the extra memory managing function can be used is enabled.

The maximum number of extra banks represents the maximum number of extra banks that can be possessed.

A page attribute imparted to an extra page is an attribute that can be imparted to a page composing an extra page upon mapping to the page 14 in response to a mapping request thereto. If the extra attribute is set to the page 14, the significance of the preload attribute and the write-back attribute is changed as follows.

If the extra attribute to be imparted to the bank 16 is set, the use of the extra memory managing function to the page 14 is declared. Hence, an error occurs if the bank 16 to which the extra bank attribute has not been set is specified upon mapping to the page.

When the preload attribute has been set, if the page 14 as a target of mapping is a page that has not been cached, the content of the main memory 12 to be mapped is preloaded into the page 14 as an extra page. If the page 14 as a target of acquisition is a page that has been cached, it is considered to have already been preloaded so that a DMA transfer is not performed.

When the write-back attribute has been set, the tag 15 is invalidated upon unmapping to the page 14. If uncaching is performed under a given condition, the content of the page 14 is write-backed to the main memory 12. The page 14 composing a pseudo-cache memory page to which the extra attribute has been set will not be write-backed until it is uncached. If it has been cached, it is not preloaded.

A description will be given to the page state of an extra page.

The FREE state (common to the page state) is defined as a state of the page 14 not reserved (not acquired) by a thread and not composing an extra page. A page in the FREE state is termed a FREE page. Since the FREE state is an internal state, it cannot be recognized from the outside. When the page 14 is reserved, a transition to a PRE-EXTRA state is made.

The PRE-EXTRA state is defined as a state of the page 14 composing an extra page to which the extra attribute and the preload attribute have been set and mapping has been performed but the preloading of which has not been completed yet. A page in the PRE-EXTRA state is termed a PRE-EXTRA page. If the preload attribute has not been set, the tag 15 is validated and then a transition to an EXTRA state is made.

If the preload attribute has been set, the tag 15 is validated after the completion of the preload and then a transition to an EXTRA state is made.

The EXTRA state is defined as a state of a page composing an accessible extra page to which the extra attribute has been set. A page in the EXTRA state is termed an EXTRA page. If unmapping to the page is performed, the tag 15 is invalidated and then a transition to a cached EXTRAFREE state is made.

The EXTRAFREE state is defined as a state of a page to which the extra attribute has been set and unmapping has been performed. A page in the EXTRAFREE state is termed an EXTRAFREE page. If the EXTRAFREE page to which the write-back attribute has been set is uncached, the write-back is performed so that a transition to a PRE-FREE state is made. Mapping to a page to which the extra attribute has not been set causes a transition to a PRE-ALLOC state. If a cache hit occurs during the mapping to a page to which the extra attribute has been set, the tag 15 is validated and then a transition to the EXTRA state is made.

The PRE-FREE state is defined as a state of a page composing an extra page to which unmapping has been performed but the write-back of which has not been completed yet. A page in the PRE-FREE state is termed a PRE-FREE page. If the write-back attribute has not been set, the page is released and then shifts to the FREE state. If the write-back attribute has been set, the page is released after the completion of the write-back and then shifts to the FREE state.

It is to be noted that an extra page state is included in extra page information. The number of extra banks that can be possessed by an independent bank indicates the number of banks to which the extra attribute has been set. Although a FREE bank is possessed as an extra bank, if the extra attribute has been set to the plurality of banks 16, the banks to which the extra attribute has been set are evenly distributed to the individual banks 16.

A condition for a cache hit in an extra page is the matching of the addresses and number of pages specified when the mapping request is issued to the page with the addresses and number of cached pages.

Thus, in determining a weight for an extra page and the replacement thereof, the page 14 composing a pseudo-cache memory page to which the extra attribute has been set will not be write-backed till it is uncached. If it has been cached, it is not preloaded. To reduce an amount of DMA transfer, it becomes necessary to preferentially leave the page 14 to which the preload attribute and the write-back attribute have been set in a cache. For this purpose, a weight is calculated for each of the pages 14 to which the extra attribute has been set. By using the weight for the determination of cache replacement, the cache is optimized. If some of the plurality of pages 14 composing an extra page are released, each of the remaining pages composing the extra page is uncached.

The synchronization between a physical region and an extra page when the extra memory managing function is validated in association with the timing of synchronization between the main memory 12 and the extra page is timed not with the mapping or unmapping to the page but with the occurrence of the preload and the write-back. If the extra memory managing function is not used, the preload and the write back occur at the time of performing the mapping and unmapping to a page. If the extra memory managing function is used, on the other hand, the preload and the write-back occur when the cache is invalidated by performing mapping to another page or the caching of the page.

The banks 16 for which a page is acquired in accordance with a method for determining a bank for which an extra bank is acquired are grouped into the following four types.

(A) Page Specified by Page Specifier
(B) Independent Bank
(C) Extra Bank Possessed by Independent Bank
(D) FREE Bank Next, conditions for determining the banks 16 are grouped into the following five types.

(1) Match between Physical Address and Number of Pages (Cache Hit)
(2) Capability of Reserving Required Number of Pages from FREE Page
(3) Capability of Reserving Required Number of Pages from FREE page and EXTRAFREE Page with Weight of 0
(4) Capability of Reserving Required Number of Pages from FREE page, EXTRAFREE Page with Weight of 0, and EXTRAFREE Page with Weight of 1
(5) None (Reservation Assured)

Figure 22:
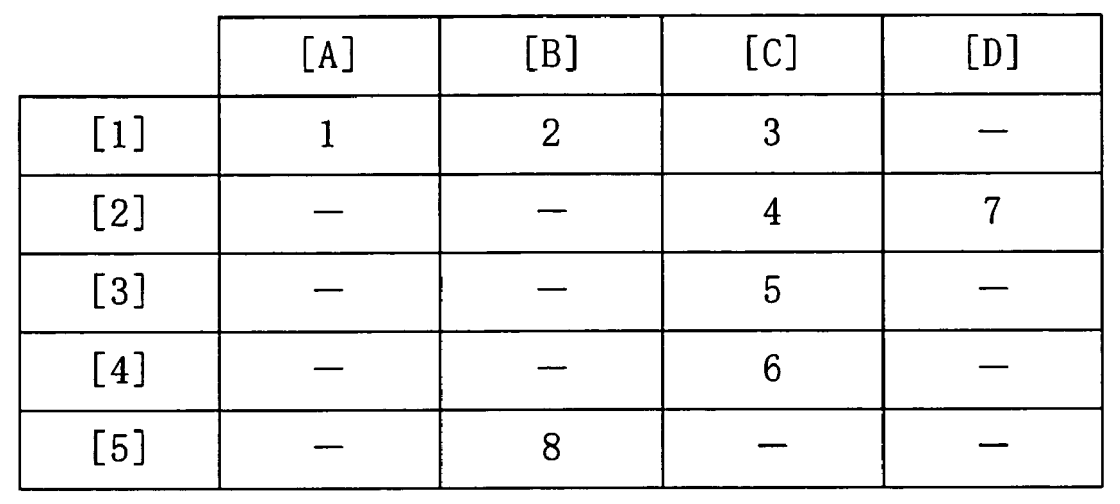

By applying the conditions for determination to the banks 16 thus grouped in the order shown in, e.g., FIG. 22, the bank 16 for which the page 14 is reserved is determined.

(Extra Bank Release Method)

A description will be given next to a method for releasing an extra bank.

First, a method for selecting an extra bank to be released when the number of extra banks that can be possessed by an independent bank is reduced will be described.

The case in which an extra bank should released is either the case in which, when a thread reserves the banks 16, only FREE banks not used as extra banks are insufficient in number or the case where the number of banks to which the extra attribute has been set is increased so that the allocation of extra banks to each of the banks 16 is changed.

In either of these cases, the number of extra pages that can be possessed by each of independent banks is calculated again. If the number of banks that can be possessed by the independent bank has been reduced, extra banks to be released are determined based on the respective weights of the extra banks (hereinafter referred to as bank weights). As the bank weight for each of extra banks, the sum of the respective weights of the pages 14 composing the extra bank is used. The extra banks are released in order of increasing bank weight.

By way of example, a description will be given herein below to a method for selecting banks to be released in the case where a transition is made from the state in which an independent bank possesses three extra banks to the state in which the number of extra banks that can be possessed by the independent bank is 1 with reference to FIGS. 23A and 23B.

Figure 23A:
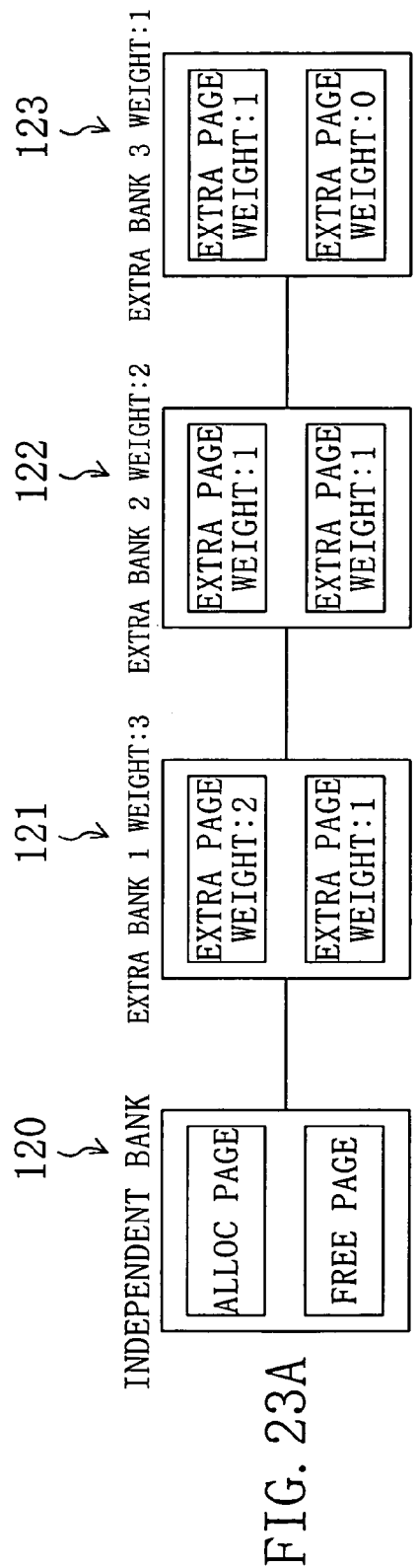
FIGS. 23A and 23B are conceptual views illustrating a method for releasing an extra bank of the extra memory managing function in the semiconductor device according to the embodiment.
Figure 23B:
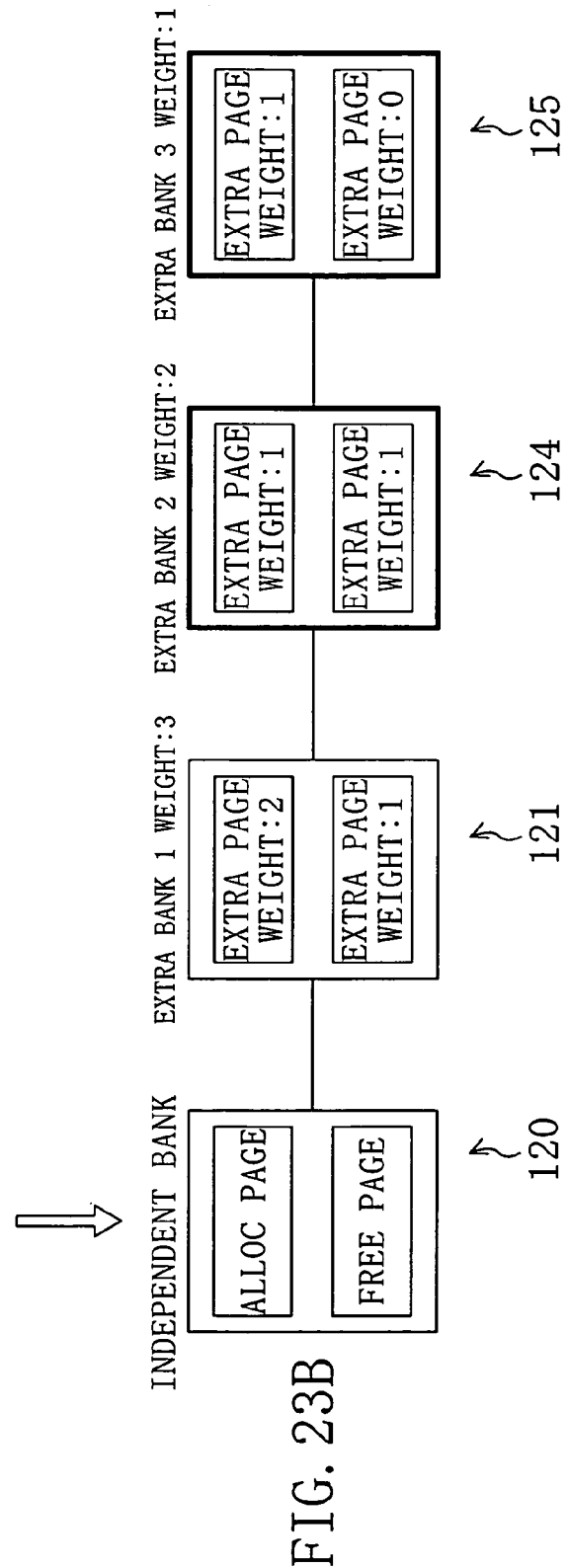

As shown in FIG. 23A, the independent bank in a state 120 has three extra banks in respective states 121, 122, and 123. An extra bank 1 in the state 121 contains the page ($A_1$) with a weight of 2 and the page ($B_1$) with a weight of 1 so that the bank weight thereof is 3. An extra bank 2 in the state 122 contains the page ($A_1$) with a weight of 1 and the page ($B_1$) with a weight of 1 so that the bank weight thereof is 2. An extra bank 3 in the state 123 contains the page ($A_1$) with a weight of 1 and the page ($B_1$) with a weight of 0 so that the bank weight thereof is 1.

It is assumed here that the number of extra banks that can be possessed by an independent bank in the state 120 is reduced from 3 to 1. Since the independent bank in the state 120 has the three extra banks having the respective bank weights of 3, 2, and 1, the two of the three extra banks having the lighter weights, i.e., the extra bank 2 in the state 122 having the weight of 2 and the extra bank 3 in the state 123 having the weight of 1 are determined to be released. Consequently, the extra banks 2 and 3 shift to the states in which the release thereof is requested as shown in FIG. 23B so that the extra bank 2 shifts to a state 124 and the extra bank 3 shifts to a state 125.

A method for releasing extra banks will be described next.

The description will be given first to an operation before a release request to extra banks is issued with reference to FIGS. 24A and 24B.

It is assumed here that one thread cyclically performs an operation and has acquired the two banks 16 by issuing a mapping request and an unmapping request to the three pages 14 which are the pages $A_1$, $B_1$, and $C_1$ in one cycle.

As shown in the timing chart of FIG. 24A, if one thread issues a mapping request to the page ($A_1$), the page ($A_1$) is in the EXTRA state during a period until an unmapping request is issued to the page ($A_1$). Then, a mapping request is issued to the page ($B_1$) and the page ($B_1$) is in the EXTRA state during a period until an unmapping request is issued to the page ($B_1$). Subsequently, a mapping request is issued to the page ($C_1$) and the page ($C_1$) is in the EXTRA state during a period until an unmapping request is issued to the page ($C_1$).

Since the pages ($A_1$), ($B_1$), and ($C_1$) are reserved by the independent bank in a state 130 and an extra bank in a state 131 in non-overlapping relation, as shown in FIG. 24B, caching of each of the pages ($A_1$), ($B_1$), and ($C_1$) is validated when a mapping request is issued thereto so that it is cached on an unmapping request. Accordingly, the preload and the write-back are not performed. FIG. 24B shows the state of the independent bank after an unmapping request is issued to the page ($C_1$).

The description will be given next to an operation from the time an acquisition request is issued to the bank 16 by another thread until the extra bank in the state 131 is released with reference to FIGS. 25A an 25B.

Figure 25A:
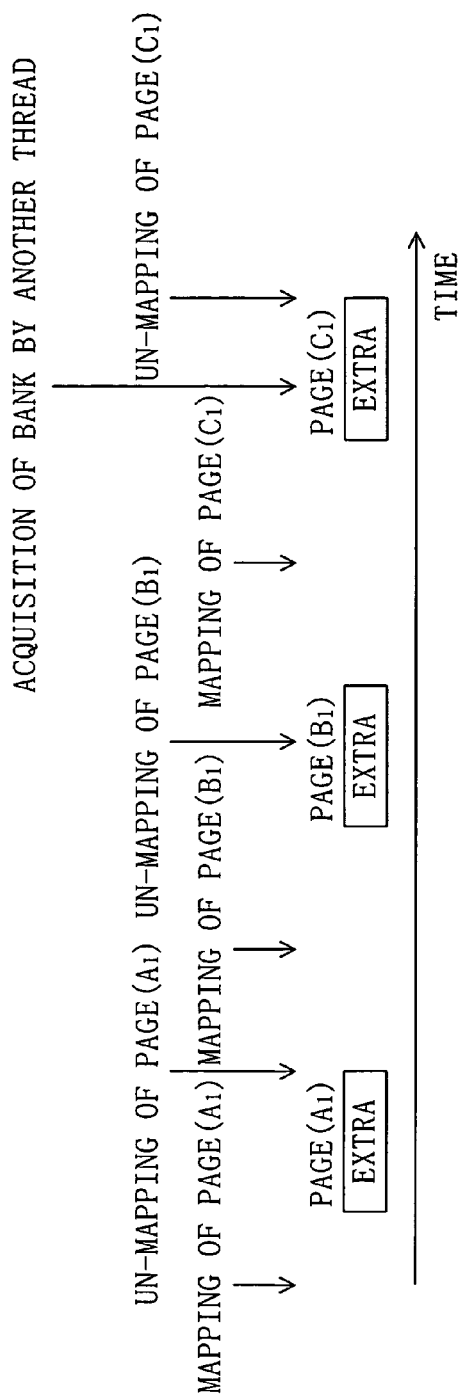
FIG. 25A is another timing chart illustrating the method for releasing an extra bank of the extra memory managing function in the semiconductor device according to the embodiment.

As shown in FIG. 25A, one thread successively issues a mapping request and an unmapping request to the pages ($A_1$) and ($B_1$), respectively, and further issues a mapping request to the page ($C_1$) so that the page ($C_1$) shifts to the EXTRA state. It is assumed here that, during a period during which the page ($C_1$) is in the EXTRA state, another thread issues an acquisition request to the bank 16 and the number of extra banks that can be possessed by an independent bank in the state 130 is reduced from 1 to 0. At this time point, it is registered that a release request has been issued to an extra bank in a state 132.

Figure 25B:
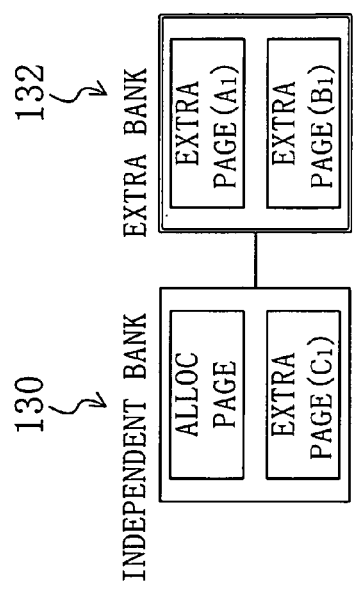
FIG. 25B is another conceptual view illustrating the method for releasing an extra bank of the extra memory managing function in the semiconductor device according to the embodiment.
Figure 27:
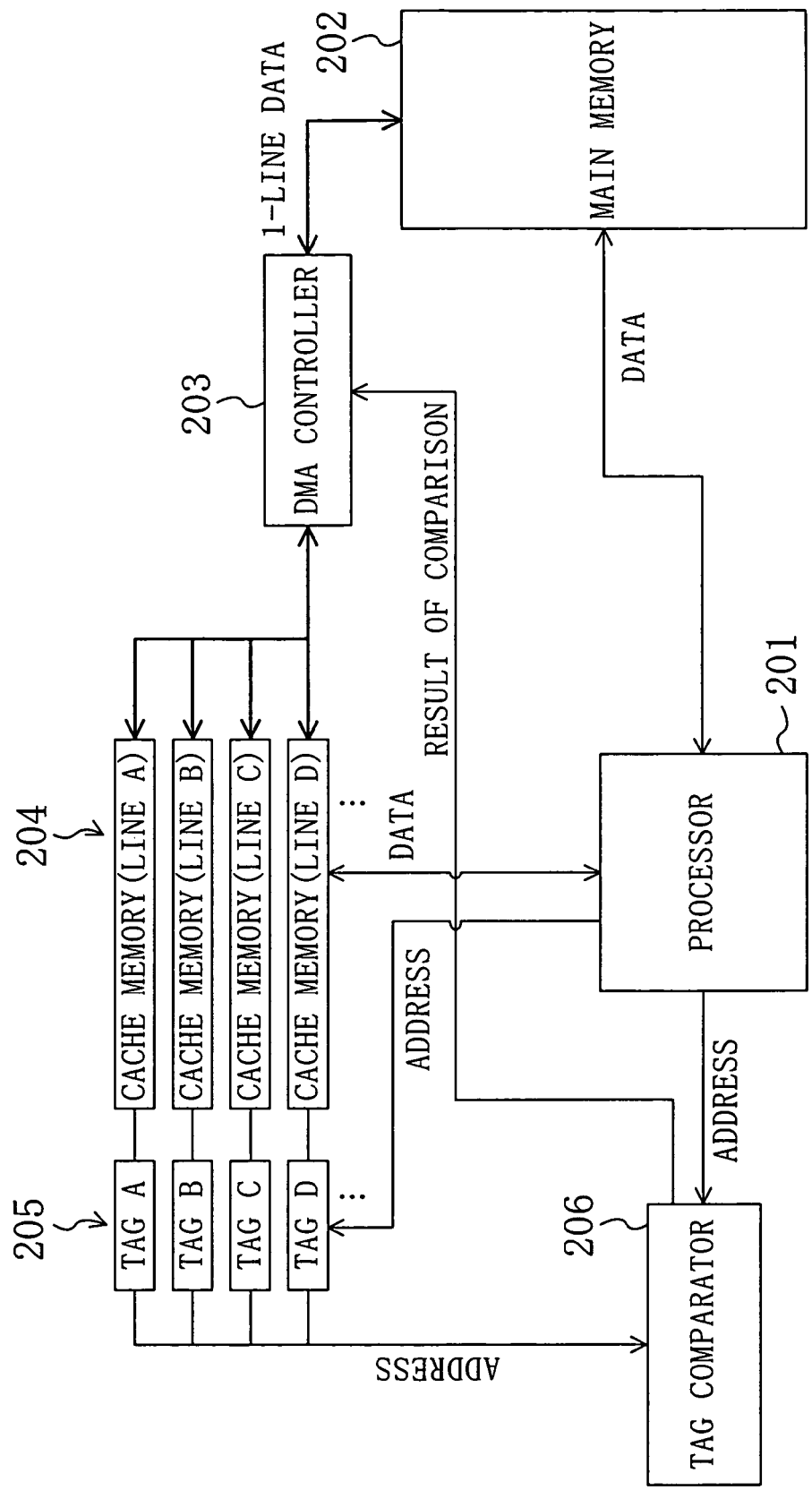
FIG. 27 is a block diagram showing a conventional semiconductor device having a cache memory.

Next, after the request to acquire the bank is issued by the other thread, a page in the extra bank in the state 132 the release of which has been requested is write-backed upon the unmapping to the page and released after the completion of the write-back. FIG. 25B shows the state of the independent bank after the unmapping request to the page ($C_1$) is issued.

The description will be given next to an operation until the extra bank is released during the operation of the thread with reference to FIGS. 26A and 26B.

First, the operation when the mapping request and the unmapping request are issued to the page ($A_1$) will be described with reference to FIG. 26A. Since the page ($A_1$) has been cached when the mapping request is issued to the page ($A_1$), the mapping to the page ($A_1$) is enabled by only acquiring the cached page 14 and further validating the corresponding tag 15. When the unmapping request is then issued to the page ($A_1$), it is determined whether or not a release request has been issued to the extra bank containing the page ($A_1$). Since the case where the release request has been issued is assumed here, the write-back to the page ($A_1$) is performed during a period 180 so that the page shifts to the FREE state.

Likewise, when the unmapping request is issued to the page ($B_1$), it is determined whether or not a release request has been issued to an extra bank containing the page ($B_1$). Since the release request has also been issued here, the write-back to the page ($B_1$) is performed during a period 181 so that the page shifts to the FREE state.

At this time point, the extra bank possessed by the independent bank in the state 130 is brought into a state 133 and each of the pages composing the extra bank shifts to the FREE state so that the release of the bank is performed.

Since each of the pages ($A_1$) and ($B_1$) to which the release request has been issued is contained in the extra bank, it is write-backed in the event of an unmapping request. On the other hand, the page ($C_1$) contained in the independent bank is cached also when an unmapping to the page is issued so that the page ($C_1$) is not write-backed.

In FIG. 26B, a reference numeral 130 represents the state of the independent bank after the unmapping request is issued to the page ($C_1$). Since the extra bank possessed by the independent bank shifts to the state 133 after an unmapping request is issued to the page ($B_1$), it has been released so that the execution of the thread is performed thereafter only in the independent bank.

Thus, the present embodiment allows a further reduction in an amount of memory transfer by using empty memories as extra memories.

In addition, a memory to be cached which has a relatively large capacity achieves a reduction in the circuit scale of the semiconductor device according to the present invention compared with a conventional cache memory. Moreover, a program producer can circumvent a reduction in processing efficiency resulting from a cache miss due to easier scheduling of the cache.

Although the present embodiment has shown the example in which the tag comparator 17 and the like are composed of hardware and the pseudo-cache manager 18 is composed of the program of the processor 11, the use of hardware or software makes no difference provided that a similar function is performed.

The semiconductor device according to the present invention has the effects of reducing an amount of memory transfer necessary for memory replacement and reducing circuit scale and is useful as a semiconductor device in which a processor in a broad sense has a memory replacement mechanism. The processor in a broad sense basically indicates a processor mounted on electronic equipment having real time property. As specific embodiments of the device, there can be listed a video/audio recording/reproducing apparatus using a disk, such as a DVD (Digital Versatile/Video Disk), a CD (Compact Disk), or an MD (Mini Disk), as a recording medium, optical equipment including a DVC (Digital Video Camera) and a DSC (Digital Still Camera), an IC recorder using an SD memory card or the like as a recording medium, a mobile phone, a mobile information terminal, and the like.

What is claimed is:

1. A semiconductor device comprising:
a processor;
a first memory unit accessed by the processor and serving as a main memory;
a plurality of page memory units obtained by partitioning a second memory unit which is different from the first memory unit and is accessible within several clock cycles by the processor at a speed higher than a speed at which the first memory unit is accessible and serves as a cache memory such that each of the page memory units has a storage capacity of several kilobytes;

a tag for adding, to each of the page memory units, tag information indicative of an address value in the first memory unit and priority information indicative of a replacement priority;

a tag comparator for comparing, upon receipt of an access request from the processor, the address value in the first memory unit with the tag information held by the tag; and a replacement control unit for replacing respective contents of the page memory units, wherein the plurality of page memory units are assigned to groups each composed of a specified number of page memory units to compose a plurality of bank memories, the semiconductor device further comprising a bank control unit for managing the plurality of bank memories, the replacement control unit determines, upon receipt of an access request to any of the page memory units, whether or not information on a requested address of the page memory unit is held in the tag, selects, if the address information is not held, one of the plurality of page memory units based on preliminarily specified replacement information, releases the selected page memory unit, and transfers data from the requested address from the first memory unit into the page memory unit, and wherein when an application under operation is changed, the replacement control unit evenly redistributes empty memories to application programs to be executed.

2. The semiconductor device of claim 1, wherein the replacement control unit performs reservation and release of the page memory units in one operation cycle of the application program, does not reserve any of the empty memory during the cycle, and brings the allocated empty memory into a releasable state one cycle after.

3. A semiconductor device comprising:

a processor;

a first memory unit accessed by the processor and serving as a main memory;

a plurality of page memory units obtained by partitioning a second memory unit which is different from the first memory unit and is accessible within several clock cycles by the processor at a speed higher than a speed at which the first memory unit is accessible and serves as a cache memory such that each of the page memory units has a storage capacity of several kilobytes;

a tag for adding, to each of the page memory units, tag information indicative of an address value in the first memory unit and priority information indicative of a replacement priority;

a tag comparator for comparing, upon receipt of an access request from the processor, the address value in the first memory unit with the tag information held by the tag; and a replacement control unit for replacing respective contents of the page memory units, wherein the plurality of page memory units are assigned to groups each composed of a specified number of page memory units to compose a plurality of bank memories, the semiconductor device further comprising a bank control unit for managing the plurality of bank memories, the replacement control unit determines, upon receipt of an access request to any of the page memory units, whether or not information on a requested address of the page memory unit is held in the tag, selects, if the address information is not held, one of the plurality of page memory units based on preliminarily specified replacement information, releases the selected page memory unit, and transfers data from the requested address from the first memory unit into the page memory unit, and wherein when an application program under operation is changed, the replacement control unit redistributes empty memories to application programs to be executed based on the priority information preliminarily defined and held in the tag.

4. The semiconductor device of claim 3, wherein the replacement control unit performs reservation and release of the page memory units in one operation cycle of the application program, does not reserve any of the empty memory during the cycle, and brings the allocated empty memory into a releasable state one cycle after.

5. A semiconductor device comprising:

a processor;

a first memory unit accessed by the processor and serving as a main memory;

a plurality of page memory units obtained by partitioning a second memory unit which is different from the first memory unit and is accessible within several clock cycles by the processor at a speed higher than a speed at which the first memory unit is accessible and serves as a cache memory such that each of the page memory units has a storage capacity of several kilobytes;

a tag for adding, to each of the page memory units, tag information indicative of an address value in the first memory unit and priority information indicative of a replacement priority;

a tag comparator for comparing, upon receipt of an access request from the processor, the address value in the first memory unit with the tag information held by the tag; and a replacement control unit for replacing respective contents of the page memory units, wherein the plurality of page memory units are assigned to groups each composed of a specified number of page memory units to compose a plurality of bank memories, the semiconductor device further comprising a bank control unit for managing the plurality of bank memories, the replacement control unit determines, upon receipt of an access request to any of the page memory units, whether or not information on a requested address of the page memory unit is held in the tag, selects, if the address information is not held, one of the plurality of page memory units based on preliminarily specified replacement information, releases the selected page memory unit, and transfers data from the requested address from the first memory unit into the page memory unit, and wherein when an application program under operation is changed, the replacement control unit redistributes empty memories to application programs to be executed in order of increasing operation cycle.

6. The semiconductor device of claim 5, wherein the replacement control unit performs reservation and release of the page memory units in one operation cycle of the application program, does not reserve any of the empty memory during the cycle, and brings the allocated empty memory into a releasable state one cycle after.

7. A semiconductor device comprising:

a processor;

a first memory unit accessed by the processor and serving as a main memory:

a plurality of page memory units obtained by partitioning a second memory unit which is different from the first memory unit and is accessible within several clock cycles by the processor at a speed higher than a speed at which the first memory unit is accessible and serves as a cache memory such that each of the page memory units has a storage capacity of several kilobytes;

a tag for adding, to each of the page memory units, tag information indicative of an address value in the first memory unit and priority information indicative of a replacement priority;

a tag comparator for comparing, upon receipt of an access request from the processor, the address value in the first memory unit with the tag information held by the tag; and a replacement control unit for replacing respective contents of the page memory units, wherein the plurality of page memory units are assigned to groups each composed of a specified number of page memory units to compose a plurality of bank memories, the semiconductor device further comprising a bank control unit for managing the plurality of bank memories, the replacement control unit determines, upon receipt of an access request to any of the page memory units, whether or not information on a requested address of the page memory unit is held in the tag, selects, if the address information is not held, one of the plurality of page memory units based on preliminarily specified replacement information, releases the selected page memory unit, and transfers data from the requested address from the first memory unit into the page memory unit, and wherein when an application program under operation is changed, the replacement control unit redistributes empty memories to application programs to be executed in order of decreasing amount of transfer per unit time.

8. The semiconductor device of claim 7, wherein the replacement control unit performs reservation and release of the page memory units in one operation cycle of the application program, does not reserve any of the empty memory during the cycle, and brings the allocated empty memory into a releasable state one cycle after.

9. A semiconductor device comprising
a processor;
a first memory unit accessed by the processor and serving as a main memory;
a plurality of page memory units obtained by partitioning a second memory unit which is different from the first memory unit and is accessible within several clock cycles by the processor at a speed higher than a speed at which the first memory unit is accessible and serves as a cache memory such that each of the page memory units has a storage capacity of several kilobytes;
a tag for adding, to each of the page memory units, tag information indicative of an address value in the first memory unit and priority information indicative of a replacement priority;
a tag comparator for comparing, upon receipt of an access request from the processor, the address value in the first memory unit with the tag information held by the tag; and
a replacement control unit for replacing respective contents of the page memory units, wherein
the plurality of page memory units are assigned to groups each composed of a specified number of page memory units to compose a plurality of bank memories, the semiconductor device further comprising a bank control unit for managing the plurality of bank memories,
the replacement control unit determines, upon receipt of an access request to any of the page memory units, whether or not information on a requested address of the page memory unit is held in the tag, selects, if the address information is not held, the one of the plurality of page memory units having a long access cycle, releases the selected page memory unit, and transfers data of the requested address from the first memory unit into the page memory unit, and
wherein when an application program under operation is changed, the replacement control unit evenly redistributes empty memories to application programs to be executed.

10. The semiconductor device of claim 9, wherein the replacement control unit performs reservation and release of the page memory units in one operation cycle of the application program, does not reserve any of the empty memory during the cycle, and brings the allocated empty memory into a releasable state one cycle after.

11. A semiconductor device comprising:
a processor;
a first memory unit accessed by the processor and serving as a main memory;
a plurality of page memory units obtained by partitioning a second memory unit which is different from the first memory unit and is accessible within several clock cycles by the processor at a speed higher than a speed at which the first memory unit is accessible and serves as a cache memory such that each of the page memory units has a storage capacity of several kilobytes;
a tag for adding, to each of the page memory units, tag information indicative of an address value in the first memory unit and priority information indicative of a replacement priority;
a tag comparator for comparing, upon receipt of an access request from the processor, the address value in the first memory unit with the tag information held by the tag; and
a replacement control unit for replacing respective contents of the page memory units, wherein
the plurality of page memory units are assigned to groups each composed of a specified number of page memory units to compose a plurality of bank memories, the semiconductor device further comprising a bank control unit for managing the plurality of bank memories,
the replacement control unit determines, upon receipt of an access request to any of the page memory units, whether or not information on a requested address of the page memory unit is held in the tag, selects, if the address information is not held, the one of the plurality of page memory units having a long access cycle, releases the selected page memory unit, and transfers data of the requested address from the first memory unit into the page memory unit, and
wherein when an application program under operation is changed, the replacement control unit redistributes empty memories to application programs to be executed based on the priority information preliminarily defined and held in the tag.

12. The semiconductor device of claim 11, wherein the replacement control unit performs reservation and release of the page memory units in one operation cycle of the application program, does not reserve any of the empty memory during the cycle, and brings the allocated empty memory into a releasable state one cycle after.

13. semiconductor device comprising:
a processor;
a first memory unit accessed by the processor and serving as a main memory;
a plurality of page memory units obtained by partitioning a second memory unit which is different from the first memory unit and is accessible within several clock cycles by the processor at a speed higher than a speed at which the first memory unit is accessible and serves as a cache memory such that each of the page memory units has a storage capacity of several kilobytes;

a tag for adding, to each of the page memory units, tag information indicative of an address value in the first memory unit and priority information indicative of a replacement priority;

a tag comparator for comparing, upon receipt of an access request from the processor, the address value in the first memory unit with the tag information held by the tag; and a replacement control unit for replacing respective contents of the page memory units, wherein the plurality of page memory units are assigned to groups each composed of a specified number of page memory units to compose a plurality of bank memories, the semiconductor device further comprising a bank control unit for managing the plurality of bank memories, the replacement control unit determines, upon receipt of an access request to any of the page memory units, whether or not information on a requested address of the page memory unit is held in the tag, selects, if the address information is not held, the one of the plurality of page memory units having a long access cycle, releases the selected page memory unit, and transfers data from the requested address from the first memory unit into the page memory unit, and wherein when an application under operation is changed, the replacement control unit redistributes empty memories to application programs to be executed in order of increasing operation cycle.

14. The semiconductor device of claim 13, wherein the replacement control unit performs reservation and release of the page memory units in one operation cycle of the application program, does not reserve any of the empty memory during the cycle, and brings the allocated empty memory into a releasable state one cycle after.

15. A semiconductor device comprising:

a processor;

a first memory unit accessed by the processor and serving as a main memory;

a plurality of page memory units obtained by partitioning a second memory unit which is different from the first memory unit and is accessible within several clock cycles by the processor at a speed higher than a speed at which the first memory unit is accessible and serves as a cache memory such that each of the page memory units has a storage capacity of several kilobytes;

a tag for adding, to each of the page memory units, tag information indicative of an address value in the first memory unit and priority information indicative of a replacement priority;

a tag comparator for comparing, upon receipt of an access request from the processor, the address value in the first memory unit with the tag information held by the tag; and a replacement control unit for replacing respective contents of the page memory units, wherein the plurality of page memory units are assigned to groups each composed of a specified number of page memory units to compose a plurality of bank memories, the semiconductor device further comprising a bank control unit for managing the plurality of bank memories, the replacement control unit determines, upon receipt of an access request to any of the page memory units, whether or not information on a requested address of the page memory unit is held in the tag, selects, if the address information is not held, the one of the plurality of page memory units having a long access cycle, releases the selected page memory unit, and transfers data from the requested address from the first memory unit into the page memory unit, and wherein when an application program under operation is changed, the replacement control unit redistributes empty memories to application programs to be executed in order of decreasing amount of transfer per unit time.

16. The semiconductor device of claim 15, wherein the replacement control unit performs reservation and release of the page memory units in one operation cycle of the application program, does not reserve any of the empty memory during the cycle, and brings the allocated empty memory into a releasable state one cycle after.

* * * * *